US006848796B2

(12) United States Patent
Tagirov

(10) Patent No.: US 6,848,796 B2
(45) Date of Patent: Feb. 1, 2005

(54) RADIATION REFLECTOR

(76) Inventor: Djalalutdin Tajutdinovich Tagirov, RU, 113628, Moscow ul, Starokachalovskaya 18, kv. 69 (RU)

( * ) Notice: Subject to any disclaimer, the term of this patent is extended or adjusted under 35 U.S.C. 154(b) by 0 days.

(21) Appl. No.: 10/399,197

(22) PCT Filed: Sep. 17, 2001

(86) PCT No.: PCT/RU01/00380
§ 371 (c)(1),
(2), (4) Date: Apr. 11, 2003

(87) PCT Pub. No.: WO02/31918
PCT Pub. Date: Apr. 18, 2002

(65) Prior Publication Data
US 2004/0080841 A1 Apr. 29, 2004

(30) Foreign Application Priority Data
Oct. 12, 2000 (RU) ........................................ 2000125953

(51) Int. Cl.[7] .................................................. G02B 5/08
(52) U.S. Cl. ....................................................... 359/846
(58) Field of Search ................................. 359/838, 846, 359/849, 871, 872; 126/684

(56) References Cited
U.S. PATENT DOCUMENTS 3,054,328 A       9/1962 Rodgers
3,326,624 A       6/1967 Von Maydell et al.
4,033,676 A       7/1977 Brantley, Jr. et al.
4,312,326 A   *   1/1982 Johnson, Jr. ................ 126/606

FOREIGN PATENT DOCUMENTS

| CH | 671832 A5 | 9/1989 |
| DE | 1199017 A | 8/1965 |
| RU | 2163353 C1 | 2/2001 |
| SU | 1762358 A1 | 9/1992 |

OTHER PUBLICATIONS

International Search Report (in English) for PCT/RU01/00380.

English Translation of Form PCT/IPEA/409 for PCT/RU01/00380.

\* cited by examiner

Primary Examiner—Euncha Cherry
(74) Attorney, Agent, or Firm—Abelman, Frayne & Schwab

(57) ABSTRACT

A radiation reflector may be used in space telecommunications, having spherical reflecting surfaces and/or rectangular reflecting surfaces which may be folded, as required. The radiation reflector has an arrangement of reflecting surfaces on foldable frames which may be in the form of interacting balls or rings mounted on pneumatic tubes or ropes.

14 Claims, 13 Drawing Sheets

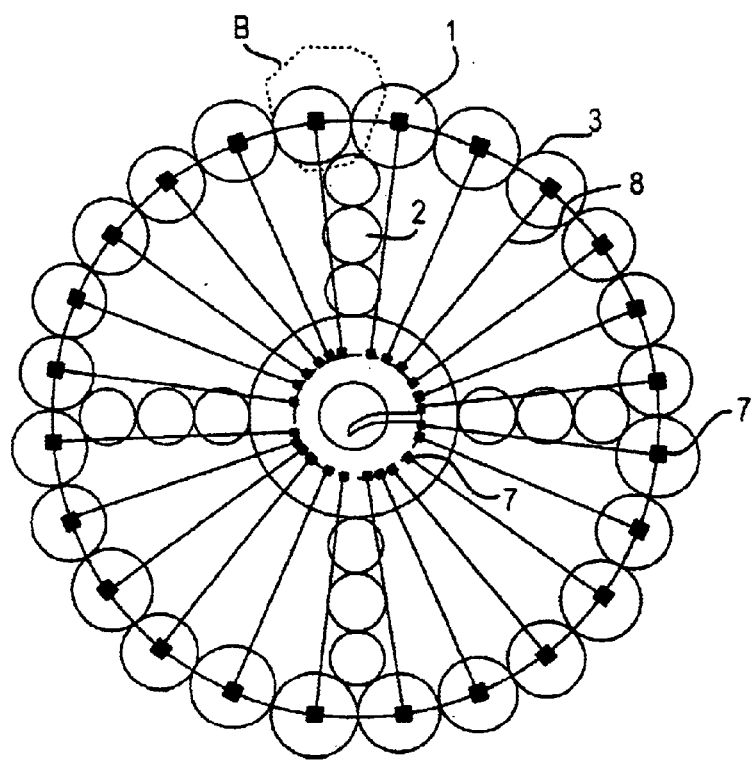
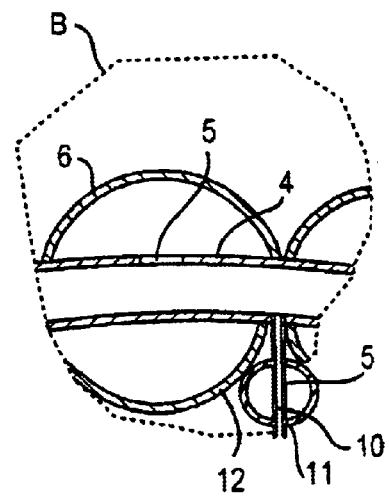
FIG. 1a    FIG. 1b
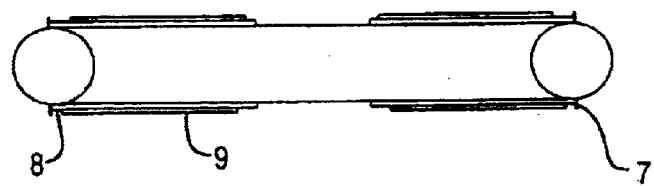
FIG. 1c

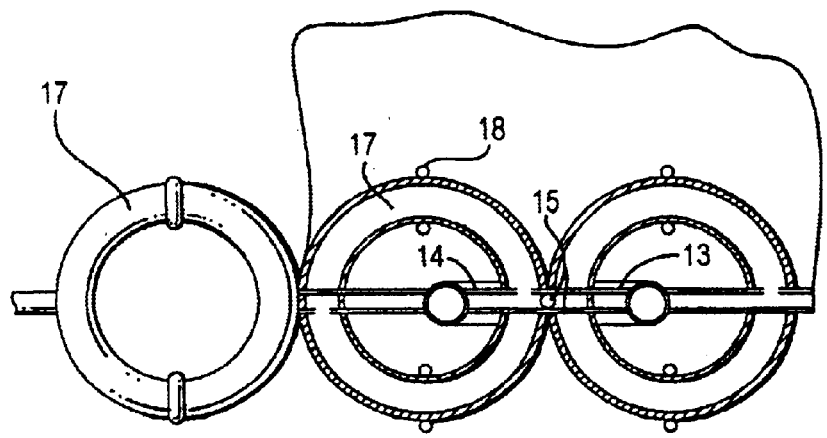
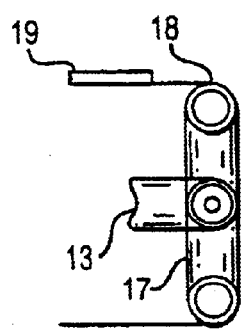
FIG. 2a  FIG. 2b
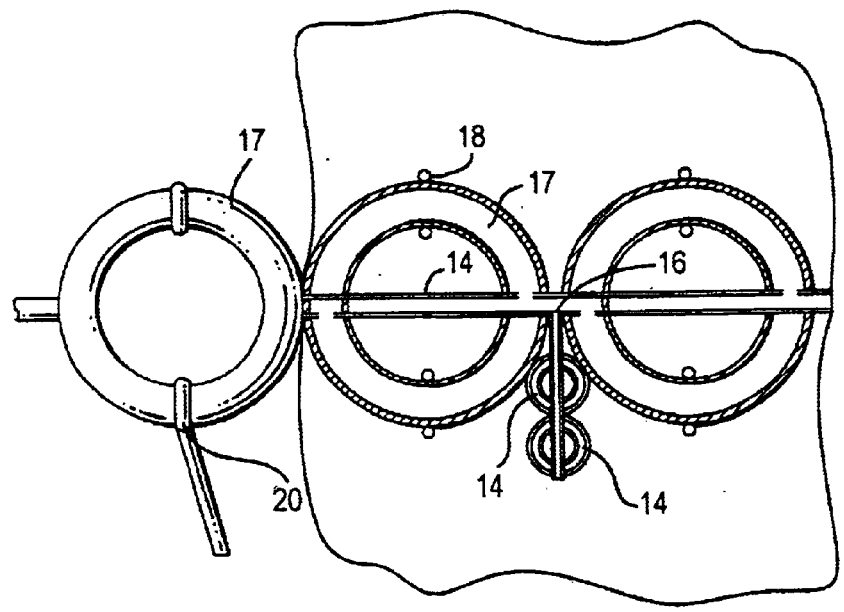
FIG. 2c

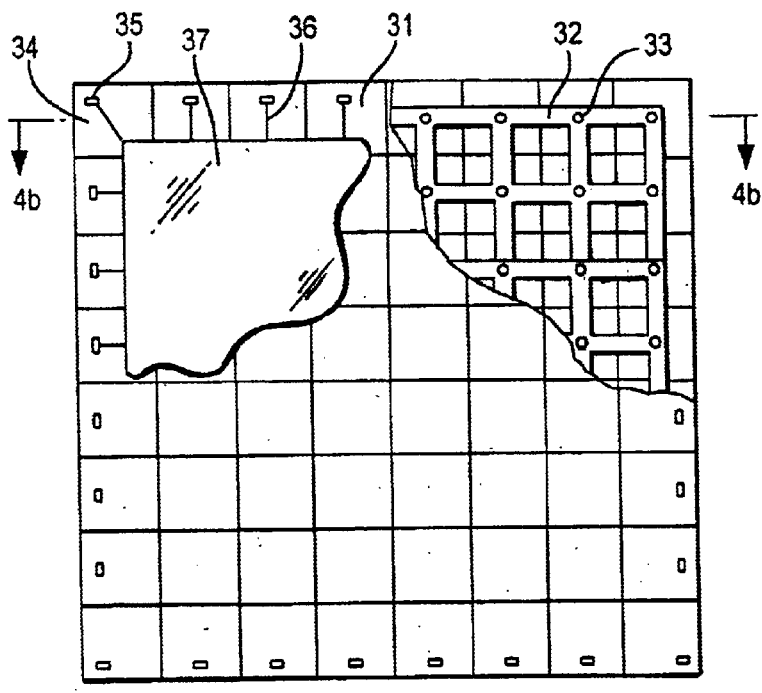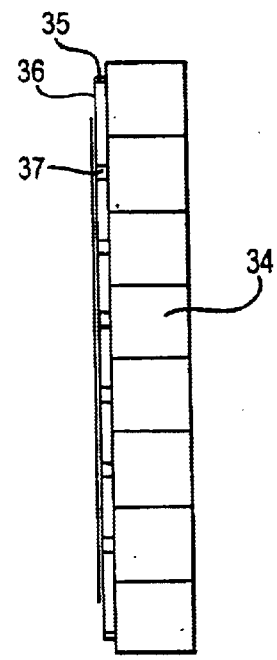
FIG. 4a
FIG. 4c
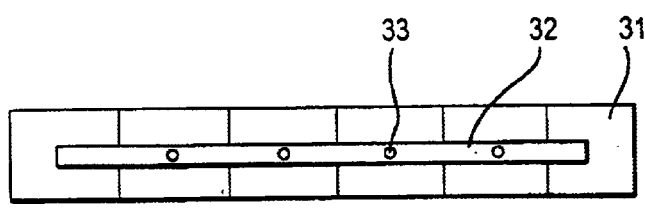
FIG. 4b
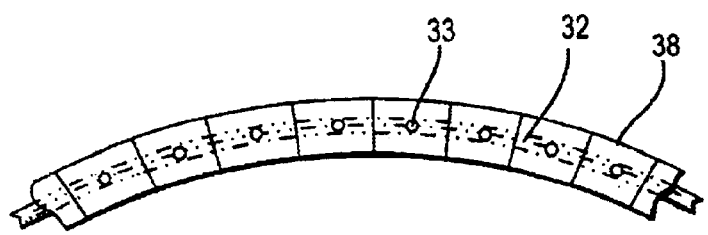
FIG. 4d

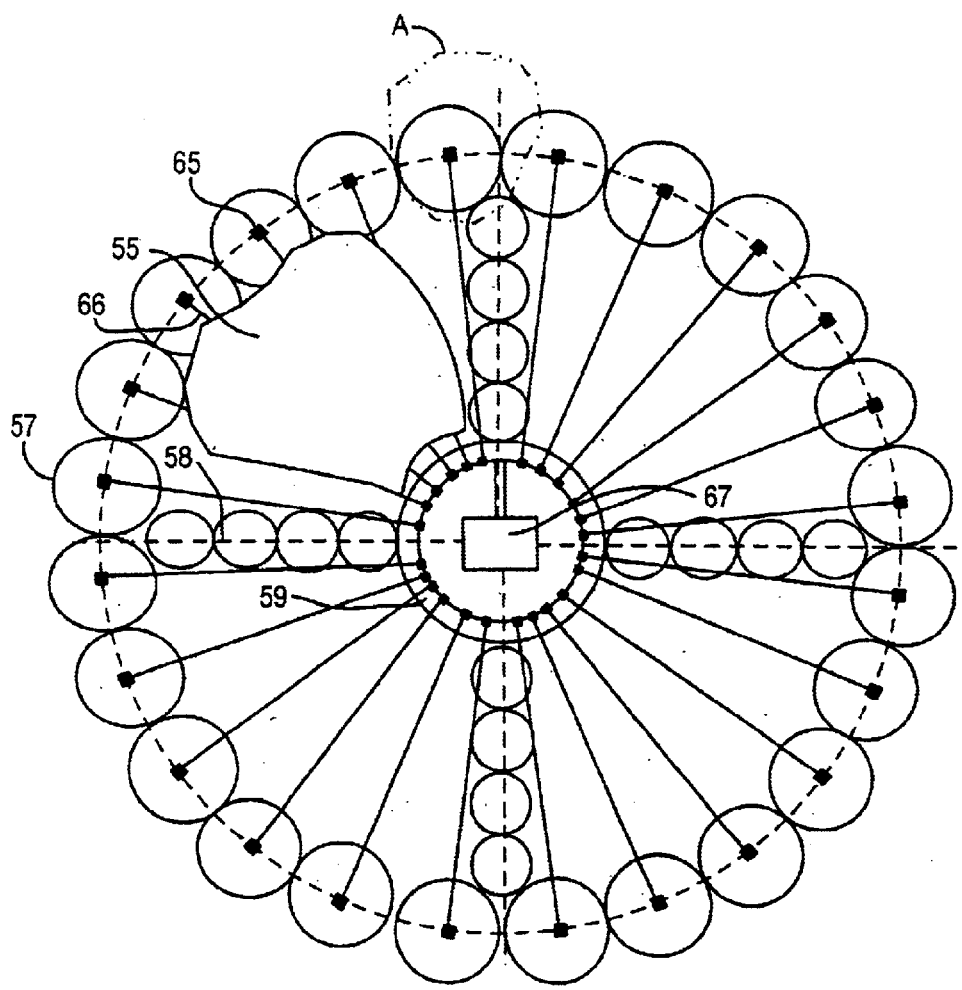
FIG. 7a
FIG. 7b
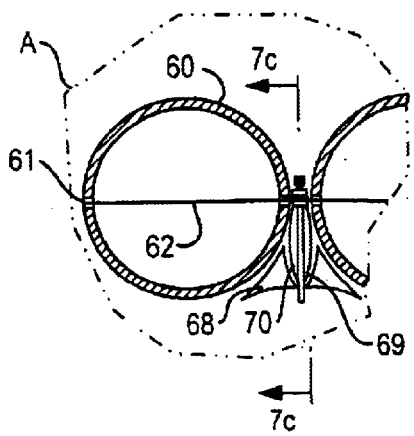
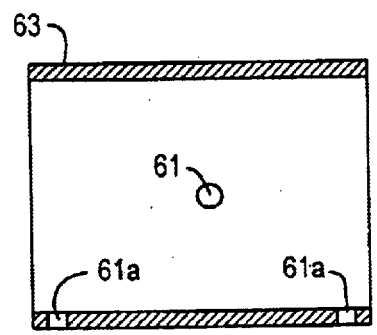
FIG. 7d
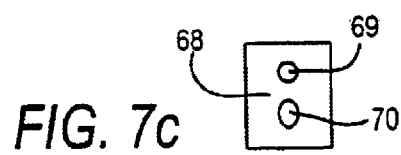
FIG. 7c

FIG. 13a
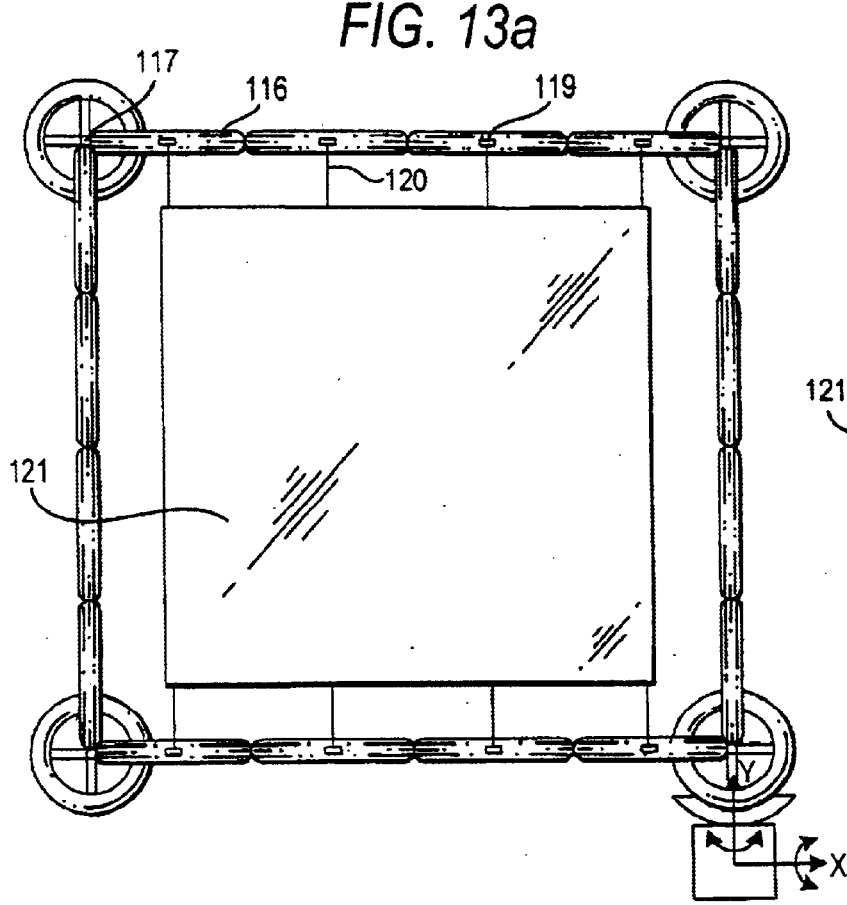
FIG. 13b
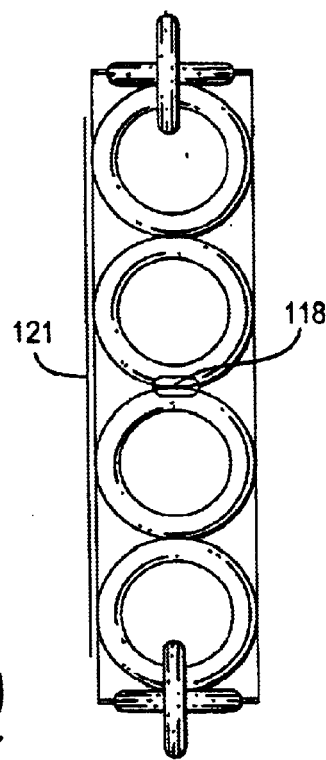
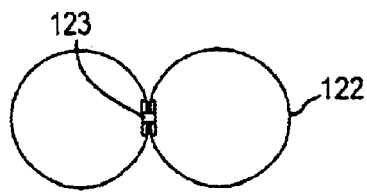
FIG. 13c
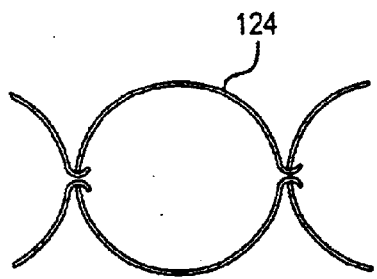
FIG. 13d
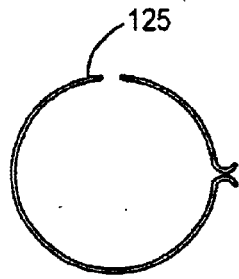
FIG. 13e
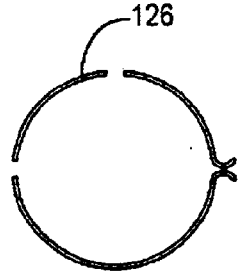
FIG. 13f

RADIATION REFLECTOR

BACKGROUND OF THE INVENTION

1. Field of the Invention

The invention concerns space engineering, namely, space communication engineering.

2. Description of the Related Art

There are well-known large-sized film reflectors of light, which could be used for space radio-telephone communications and night-time illumination of ground objects from space, as described in Project "Znamya", Rocket Space Complex "Energia".

Among reasons that prevent achievement of the desired technical result when using this device is the fact that a mirror sheet of the reflector is released under the influence of centrifugal force arising by its rotation.

A large-sized gyrating reflector provokes the force of inertia, which hinders the control of the device and the pointing of it at the object to be illuminated.

There are also reflectors of electromagnetic radiation, such as light, with the nearest to the aforementioned device in purpose and combination of essential attributes being described in S. D. Amirov and A. S. Aliev, "System for Illuminating an Object", described in issued Russian patent having application number RU19990111294, now Russian Patent Number RU2,163,353 C1. This can be specified as a prototype of the present invention. The prototype has internal and external pneumatic chambers installed on the guidance system and pneumatically connected with each other by radial supports, and a source of compressed gas, such as air. The pneumatic chambers and radial supports are linked to and interact with the mirror sheet, which in turn consists of elastic dielectric film coated with the light reflecting metal film, such as aluminum.

However, the known design of the radiation reflector in the Amirov et al. patent does not allow folding of the mirror sheet and receiving specular spherical surfaces with small radius of curvature.

BRIEF SUMMARY OF THE INVENTION

The task of the present invention consists of expanding the functional capabilities of the reflector by providing spherical reflecting surfaces of small radius of curvature and rectangular radiation reflectors. The technical result obtained by realization of the invention lies in the possibility to fold the mirror sheet in case of need. Square reflectors allow for the creation of a controlled solar sail of a space ship (SS).

The indicated technical result is obtained owing to the fact that the radiation reflector has internal and external pneumatic chambers and radial supports in the form of perforated flexible tubes supplied with globular interacting pneumatic cells made of an elastic material.

The external pneumatic chamber and radial supports can be also made in the form of perforated hoses with toroidal pneumatic chambers, the insides of which intercommunicate with hoses through apertures.

The external chamber and the radial supports can be also constructed as perforated flexible tubes, whose insides intercommunicate with internal cavities of toroidal pneumatic chambers. In this case the toroidal pneumatic chambers are placed on flexible tubes in a way to provide a series of alternating even and odd pneumatic chambers arranged in two perpendicular planes. In addition, pneumatic chambers partially overlap each other, that is, some parts of the tube at the same time serve the diameters of neighboring even and odd chambers.

In order to produce a square-shaped reflector, the pneumatic system is designed as a matrix of intercommunicating mutually perpendicular perforated flexible tubes, encircled by cubic pneumatic cells that interact among themselves and with a mirror sheet.

The reflector with a spherically shaped surface presents mechanically and pneumatically connected radial and concentric sectional pneumatic tubes. Sphericity is due to apertures in flexible tubes surrounded by pneumatic cells shaped as sectors of a spherical cover. Once inflated, pneumatic cells form a half-spherical concave cover of the reflector.

Convex parts of the bases of the pneumatic cells are applied with metal strips that form current-conducting rings. These rings are connected to a source of voltage adjustable with respect to a metal coat of the mirror sheet. Under the action of electrostatic forces the mirror sheet takes the spherical form. In addition, to unfold a flat film reflector, the external ring and radial supports can be configured as rings of hollow balls or rings beaded to cables whose ends are passed through apertures of a hard inner ring and connected with a mechanism of rope tension and fixation.

Eventually, a reflector with the spherical surface has a ring of concentric rings made of radiation reflecting cells, which have the form of the spherical cover sector and are beaded on two cables passed through the middles of the opposite lateral faces of the cells. Radial cables connect these concentric rings with each other, while the ends of concentric and radial cables are connected to the mechanism of cable tension and fixation.

The radiation reflector of the present invention concerns space communication engineering. The essence of the suggested technical invention lies in the following: the radiation reflector includes pneumatically connected internal and external pneumatic chambers, radial supports, and sources of compressed gas, as well as the mirror sheet formed from an elastic dielectric film, coated by a light reflecting metal layer. The external pneumatic chamber and the radial supports are designed in the form of a flexible perforated tube, which has overbuilt interacting globular pneumatic cells made of an elastic material.

Another design of the radiation reflector has the external chamber and the radial supports formed from flexible tubes with apertures surrounded by the toroidal pneumatic chambers arranged to form a chain. The alternating even and odd pneumatic chambers are oriented in perpendicular planes and interact among themselves and with the mirror sheet.

In the rectangular radiation reflector the pneumatic system is formed by a matrix of intertwined chains oriented in perpendicular planes of toroidal pneumatic chambers, which interact among themselves and with the mirror sheet.

Another design of the reflector is noted for the external ring and the radial supports formed by rings of small hollow plastic balls or rings threaded onto the cables, whose ends are passed through apertures in the rigid internal ring and ensure the possibility of cable tension and fixation.

The external pneumatic chamber and radial pneumatic tubes of the reflector can be also be formed from flexible tubes with apertures, which have overbuilt pneumatic cells made of an elastic material.

The rectangular pneumatic chamber can be also be formed by a matrix of mechanically joined perpendicular flexible tubes with apertures which are communicating and interact with each other and are mechanically connected. The apertures are surrounded by the cubic pneumatic cells, which interact among themselves and with the mirror sheet.

The hemispherical basis of the reflector can be formed by mechanically and pneumatically connected communicating radial and concentric sectional pneumatic tubes, which include flexible tubes with apertures surrounded by the overbuilt pneumatic cells made of an elastic material, for example, rubber, in the form of the spherical envelope sector.

In the last variant of the reflector, the concentric rings are formed by rings of light reflecting cells in the form of the spherical envelope sector. The cells are threaded onto a pair of cables, while the concentric rings are joined to each other by radial cables. The ends of all cables are joined to the mechanism of cable tension and fixation.

The radiation reflector also includes a second mirror sheet established in parallel to the first external pneumatic chamber. The second mirror sheet has a metal covering in the form of concentric conducting rings. The rings are connected to the newly introduced various sources of adjustable voltage relative to the metal covering of the first mirror sheet.

The outer contour of the rectangular reflector is connected to the orientation device and the second mirror sheet, which is established in parallel to the first one. The metal conducting strips applied to the mirror sheet are connected to various sources of adjustable voltage relative to the metal coating of the first mirror sheet.

In another design of the radiation reflector, the ends of radial supports are joined to each other with the elastic cable, with which the taut bands of the mirror sheet interact.

The external pneumatic chamber and the radial supports can be formed by rings of toroidal pneumatic chambers or globular pneumatic cells mechanically and pneumatically joined to each other and interacting among themselves and with the mirror sheet.

The outer contour of the rectangular reflector can be also made up as a chain of toroidal pneumatic chambers or globular pneumatic cells mechanically and pneumatically joined to each other and interacting among themselves and with the mirror sheet.

BRIEF DESCRIPTION OF THE SEVERAL VIEWS OF THE DRAWINGS

Preferred embodiments of the invention are disclosed hereinbelow with reference to the drawings, wherein designs of radiation reflectors are shown in FIGS. 1a-13f.

FIGS. 1a-1cshow the design of a radiation reflector.

FIGS. 2a-2c show the design of a radiation reflector, which is unfolded with the help of toroidal pneumatic chambers.

FIGS. 4a-4b show the design of a rectangular radiation reflector.

FIGS. 7a-7d show the design of a radiation reflector, which is unfolded with the help of hollow balls or rings.

FIGS. 13a-13f show the design of a rectangular radiation reflector.

DETAILED DESCRIPTION OF THE INVENTION

As described herein, the present invention includes designs of radiation reflectors as shown in FIGS. 1a-13f.

FIGS. 1a-1cshow the design of a radiation reflector having the following components:
 1—external pneumatic chamber;
 2—radial supports;
 3—internal pneumatic chamber;
 4—concentric tube;
 5—apertures;
 6—globular pneumatic cells;
 7—fastening eyelets;
 8—taut bands or threads;
 9—mirror sheet;
 10—radial tube;
 11—radial pneumatic cells; and
 12—joint of radial and concentric tubes.

FIGS. 2a-2c show the design of a radiation reflector, which is unfolded with the help of toroidal pneumatic chambers, having the following components:
 13—radial pneumatic chambers;
 14—flexible tube;
 15—apertures;
 16—of concentric and radial tubes;
 17—concentric external pneumatic chamber;
 18—taut bands or threads;
 19—mirror sheet; and
 20—connection for traction with the concentric external pneumatic chamber 17.

Figure 3A:
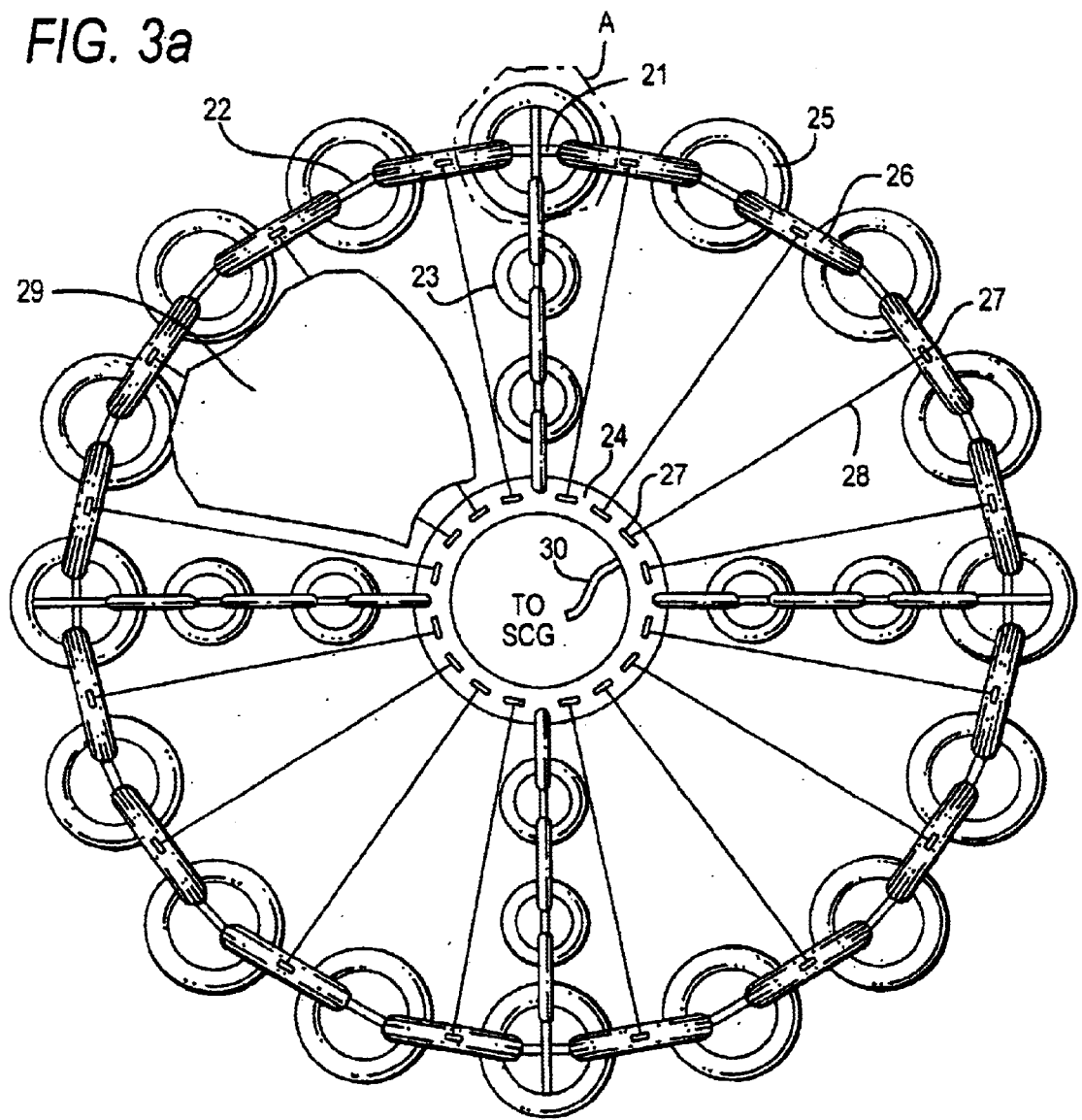
FIGS. 3a-3b show the design of a reflector, in which toroidal pneumatic chambers are connected to make a chain.
Figure 3B:
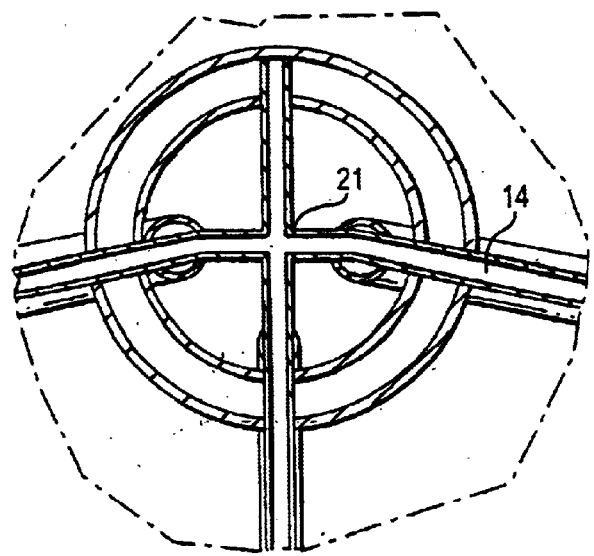

FIGS. 3a-3b show the design of a reflector, in which toroidal pneumatic chambers are connected to make a chain, having the following components:
 21—of concentric and radial tubes;
 22—external pneumatic chamber;
 23—radial supports;
 24—internal pneumatic chamber;
 25—even and odd toroidal pneumatic chambers, respectively;
 27—fastening eyelets;
 28—taut bands;
 29—mirror sheet; and
 30—hose connecting the internal pneumatic chamber with a source of compressed gas (SCG).

FIGS. 4a-4b show the design of a rectangular radiation reflector having he following components:
 31—pneumatic cells;
 32—matrix of flexible pipes;
 33—aperture;

34—pneumatic cells of the external contour of the reflector;

35—fastening eyelets;

36—taut bands;

37—mirror sheet; and

38—pneumatic cells in the form of the spherical cover sector.

Figure 5A:
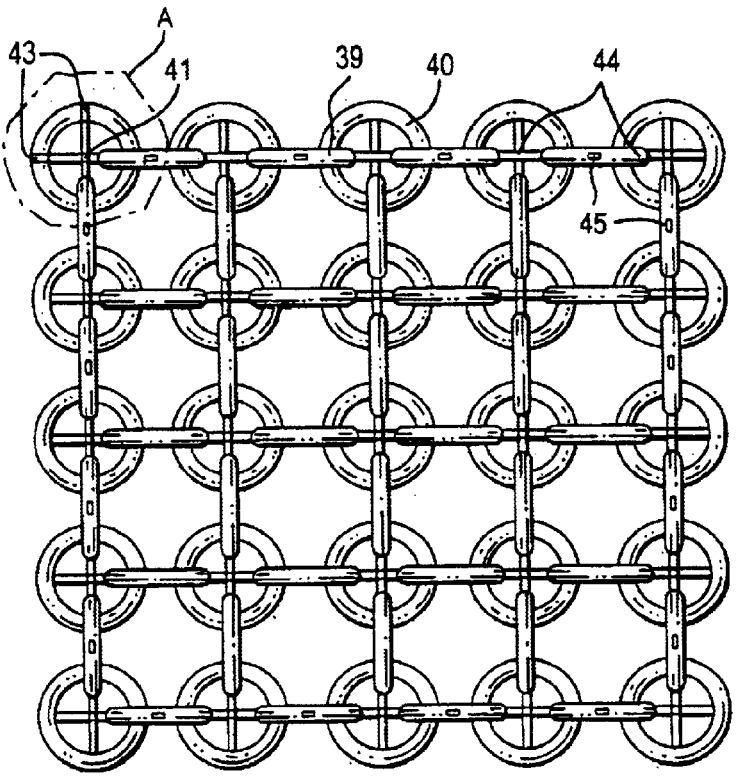
FIGS. 5a-5c show the design of a rectangular reflector, which is unfolded with the help of toroidal pneumatic chambers.
Figure 5C:
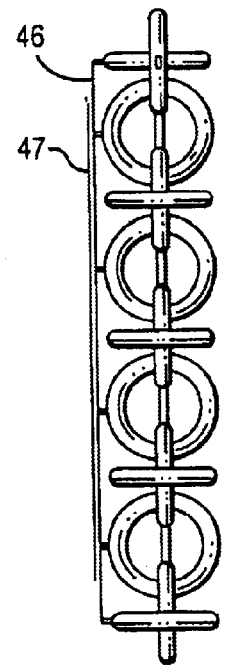
Figure 5B:
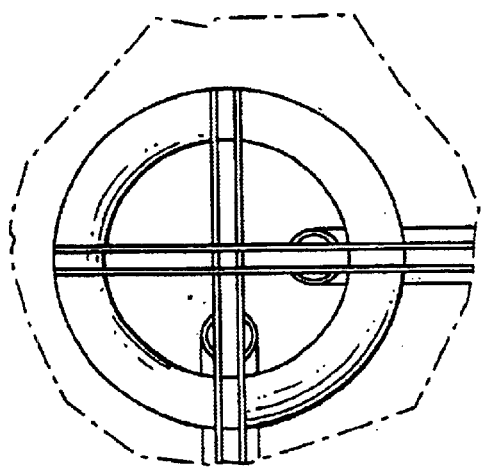

FIGS. 5a-5c show the design of a rectangular reflector, which is unfolded with the help of toroidal pneumatic chambers, having the following components:

39, 40—even and odd toroidal pneumatic chambers respectively;

41—matrix of mechanically and pneumatically connected flexible tubes;

42—apertures;

43—connections of flexible tubes with the angular toroidal pneumatic chambers;

44—matrix of the toroidal pneumatic chambers, mutually covered with a chain;

45—fastening eyelets;

46—taut bands; and

47—mirror sheet.

FIGS. 6a-6d show the design of a spherical reflector, having the following components:

48—radial section hoses;

49—concentric section hoses;

50—flexible tubes;

51—apertures;

52—pneumatic cells in the form of the spherical cover;

53—metal coat;

54—concentric current conducting rings;

55—mirror sheet; and

56—source of adjustable voltage.

FIGS. 7a-7d show the design of a radiation reflector, which is unfolded with the help of hollow balls or rings, having the following components:

57—external ring;

58—radial supports;

59—internal ring;

60—hollow balls;

61—apertures;

62—cable;

63—rings;

64—apertures;

65—eyelets for link fastening;

66—taut bands or threads;

67—unit for cable tension and fixation;

68—central cell;

69—aperture for a radial cable; and

70—aperture for a concentric cable.

Figure 8A:
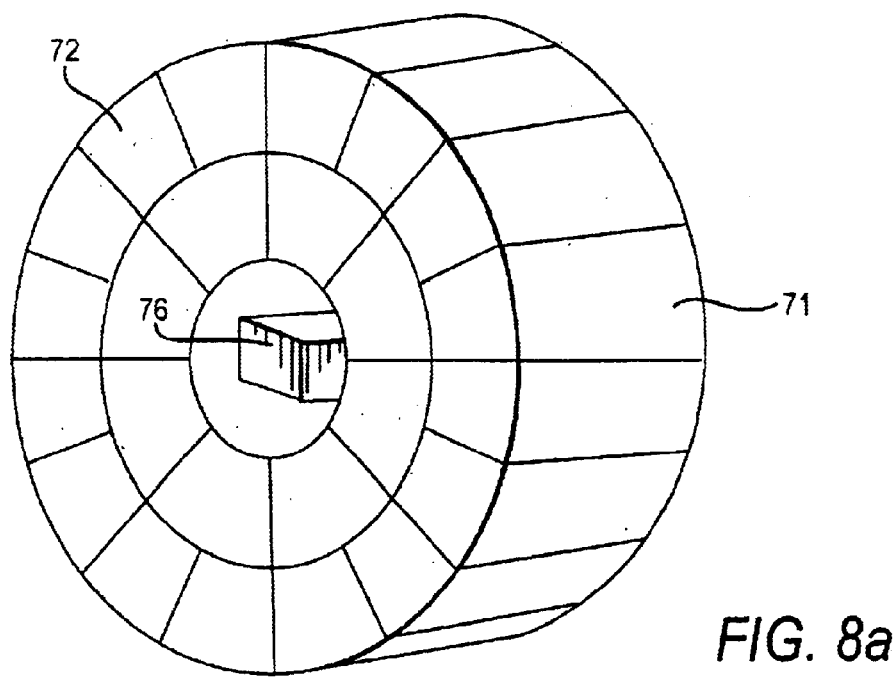
FIGS. 8a-8b show the design of a spherical reflector.
Figure 8B:
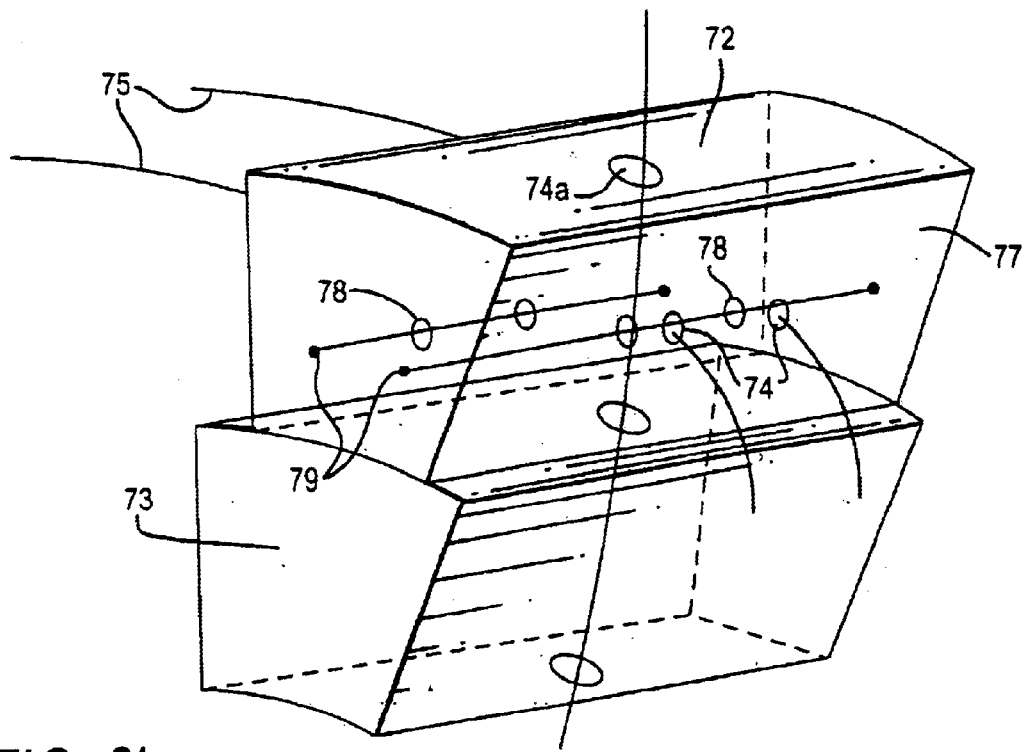

FIGS. 8a-8b show the design of a spherical reflector having the following components:

71—concentric rings of the spherical surface;

72—reflecting cells in the form of the spherical cover sector;

73—reflecting metal coat;

74—aperture;

74—radial aperture;

75—cables;

76—mechanism of cable tension and fixation;

77—trapping cells;

78—blocks; and

79—axis of block rotation.

Figure 9B:
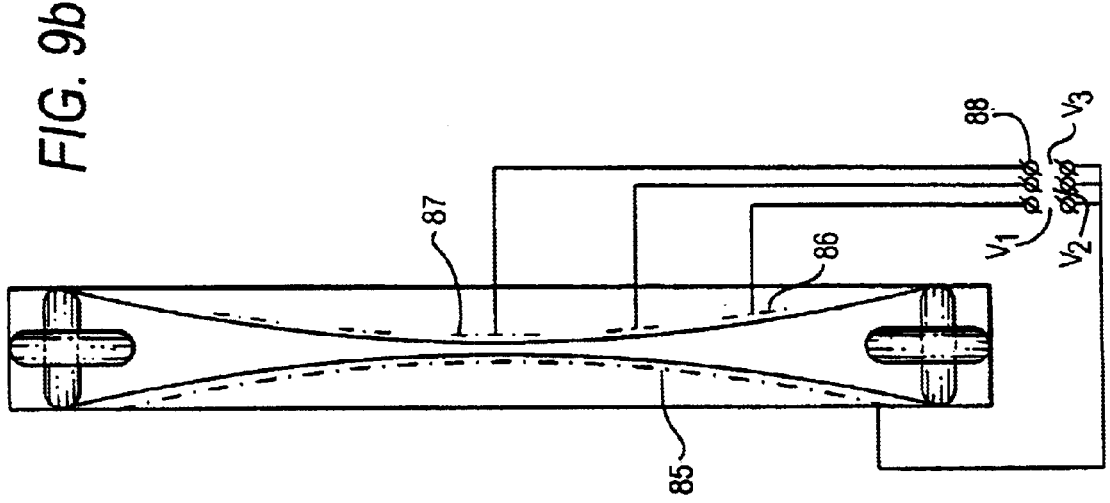
FIGS. 9a-9b show the design of a concave spherical reflector.
Figure 9A:
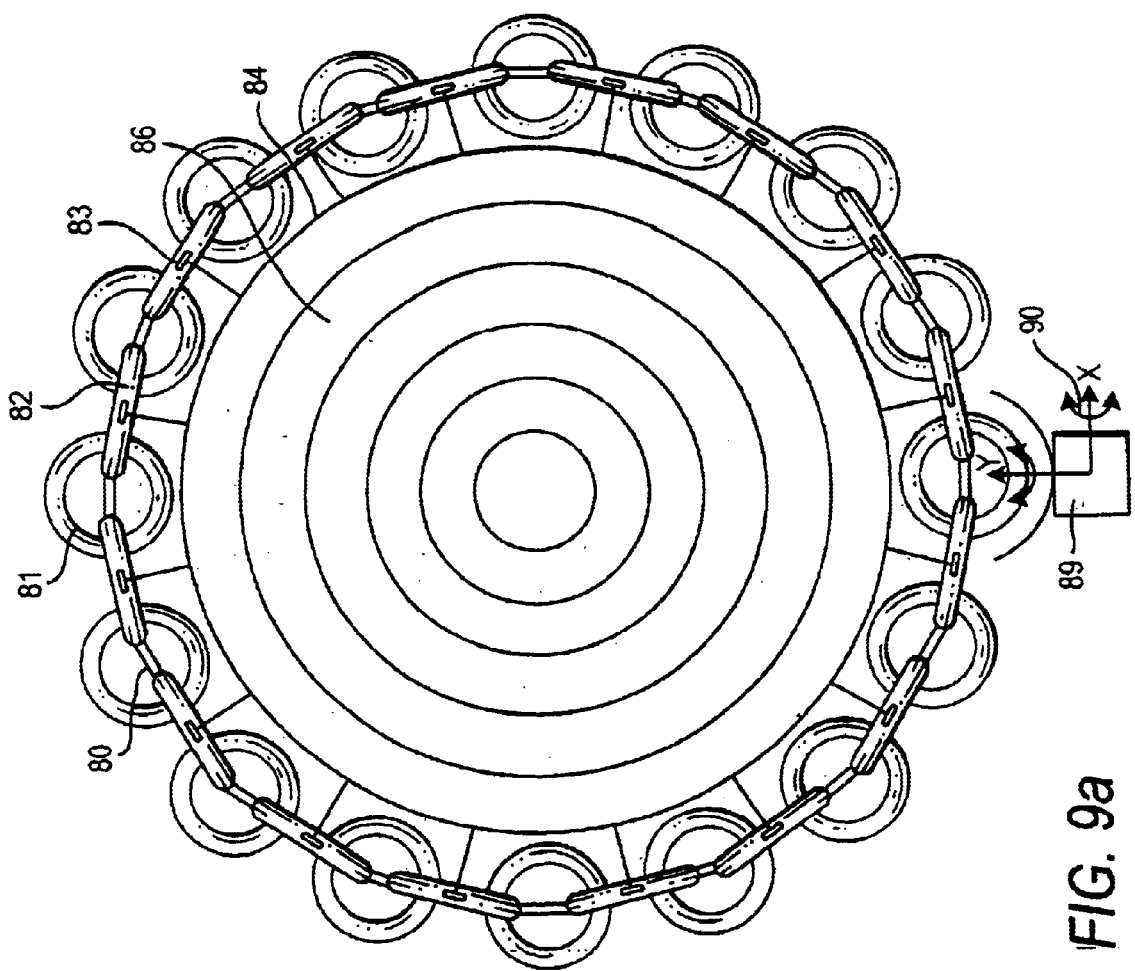

FIGS. 9a-9b show the design of a concave spherical reflector having the following components:

80—external pneumatic chamber;

81—even and odd toroidal pneumatic cells respectively;

84—taut bands;

85—the first mirror sheet;

86—the second mirror sheet;

87—metal current conducting rings;

88—sources of adjustable voltage;

89—device for orientation of the radiation reflector; and

90—OX, OY axes of the reflector rotation about $\pm\alpha$, $\pm\beta$ angles.

FIGS. 10a-10d show the design of a rectangular flat-surfaced reflector and a reflector in the form of a parabolic cylinder, having the following components:

91—I, II, III, IV—the first, second, third and fourth sections, respectively, of the rectangular reflector, with OX, OY being axes of the separate sections rotation of the reflector;

92—reflector orientation device;

93—central cells;

94—external contour of the reflector's rectangular section;

95, 96—even and odd toroidal pneumatic chambers;

97—fastening eyelets;

98—taut bands;

99—the first mirror sheet;

100—the second mirror sheet;

101—metal current conducting strips; and

102—sources of adjustable voltage.

Figure 11B:
FIGS. 11a-11b show the design of a rectangular radiation reflector.
Figure 11A:
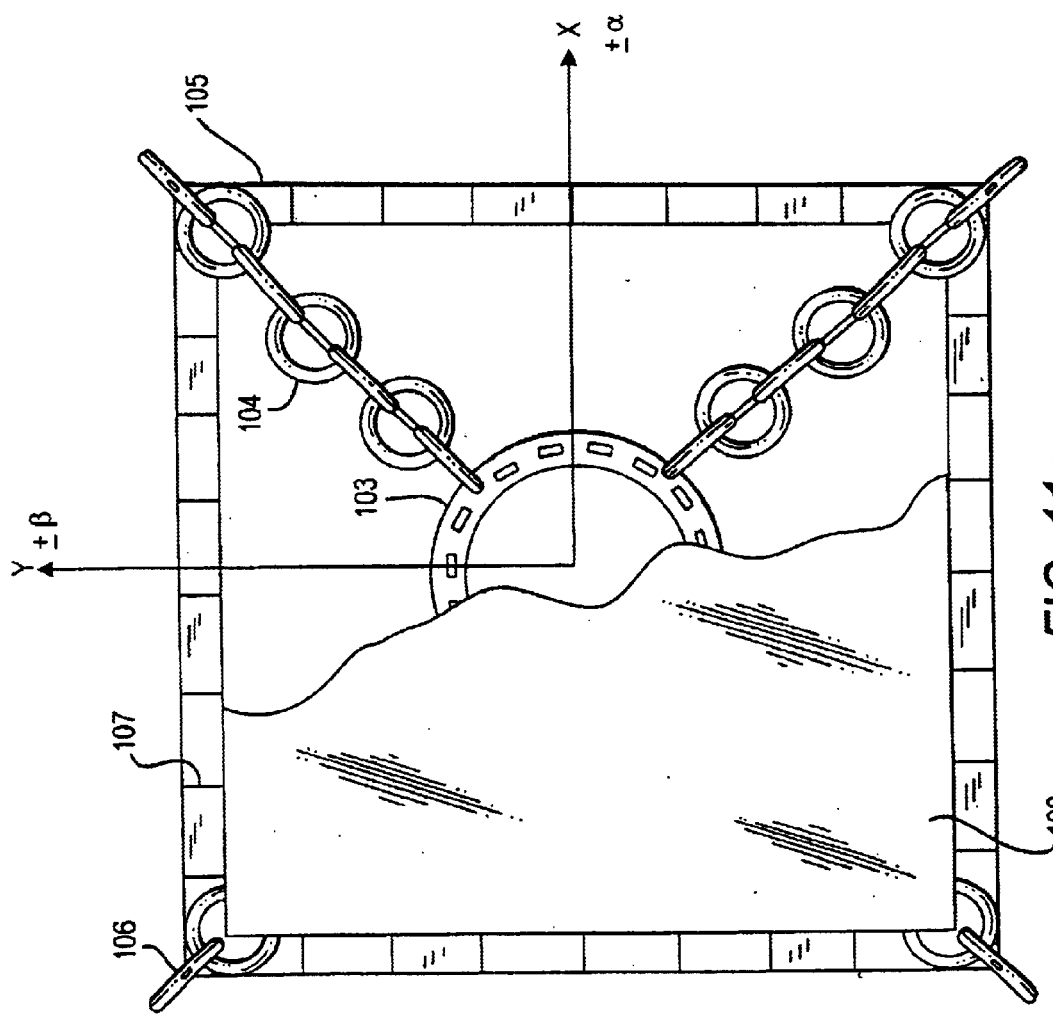

FIGS. 11a-11b show the design of a rectangular radiation reflector having the following components:

103—internal pneumatic chamber;

104—extension or telescopic radial supports;

105—elastic cable;

106—fastening eyelets;

107—braces or suspenders; and

108—mirror sheet.

Figure 12:
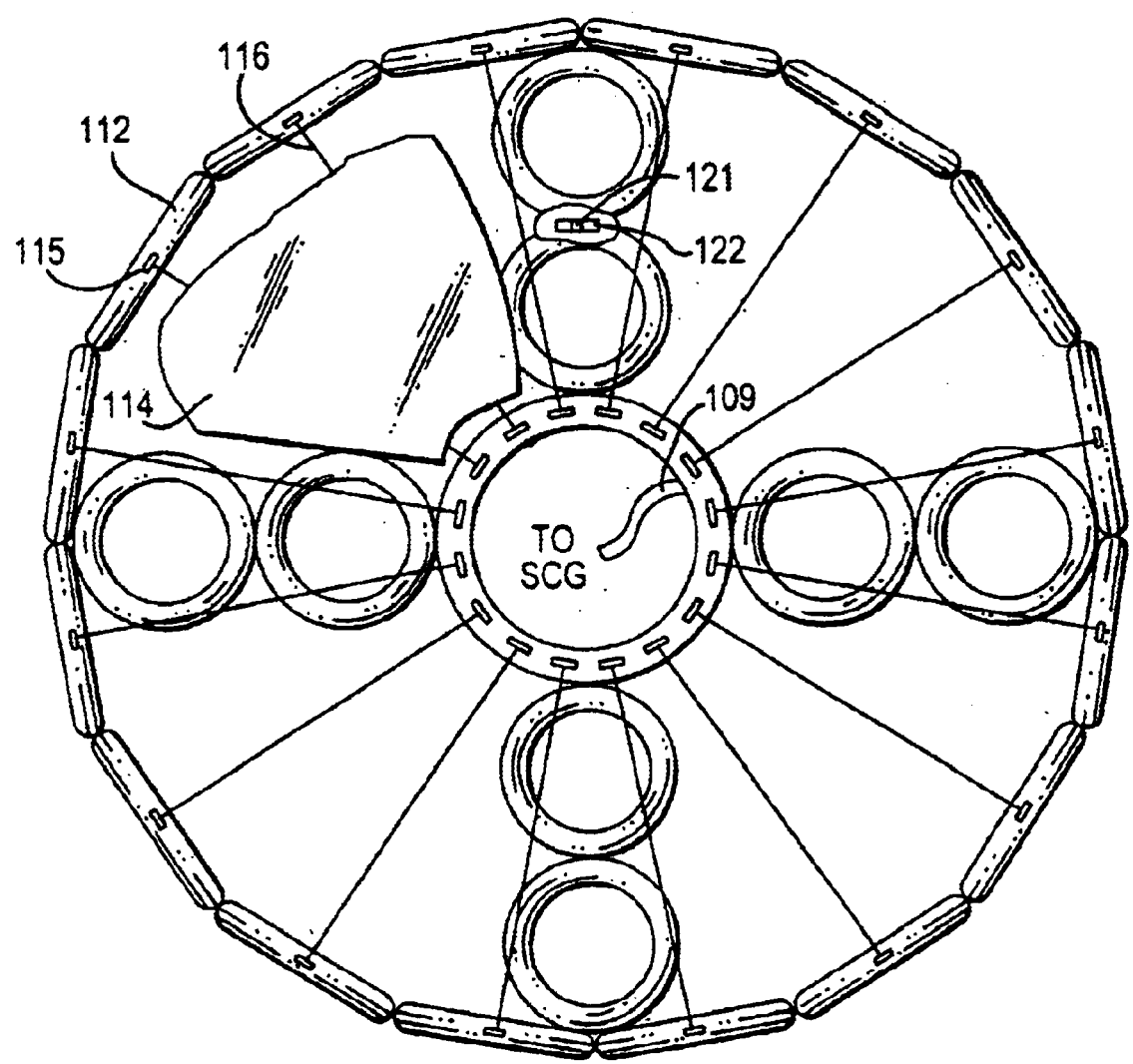
FIG. 12 shows the design of a radiation reflector.

FIG. 12 shows the design of a radiation reflector, which has an internal pneumatic chamber 109, an external pneumatic chamber 110, radial supports 111, toroidal pneumatic chambers 112, bushings or coupling sleeves 113, mirror sheet 114, fastening eyelets 115 and taut bands 116.

FIGS. 13a-13f show the design of a rectangular radiation reflector having the following components:

116—toroidal pneumatic chambers;

117—nodal or central cells;

118—coupling sleeves;

119—fastening eyelets;

120—taut bands;

121—mirror sheet;

122—globular or ball-shaped pneumatic cells;

123—connection of globular pneumatic cells.

124—toroidal cells making a direct circuit;

125—nodal or central pneumatic cells joining rectangular parts at right angles; and 126—nodal or central pneumatic cells, joining radial supports with the external ring.

The radiation reflector operates as described in the following section.

For directing the radiation reflector, it is revolved on its perpendicular axes OX and OY, which pass through the center of the internal ring 3, shown in FIG. 1*a*, similar to a Cardan wheel of the prototype in the Amirov et al. patent. For this purpose it is rigidly fixed on the external frame of the direction system gimbal suspension.

The external pneumatic chamber 1 and the internal pneumatic chamber 3 are tube-shaped analogous to bicycle inner tubes. Elastic flexible radial tubes 2, similar to fire hoses, connect these chambers with each other. Pneumatic chambers 1, 3 are concentric to each other to make, together with the radial tubes, a sealed pneumatic system, which is connected by a valve to the source of compressed gas (SCG). Once gas, such as air, is fed, pneumatic chambers 1, 3 take the form of a circle and radial tubes, the form of direct cores, and the whole pneumatic system takes the form of a wheel, as shown in FIG. 1*a*.

The following engineering solutions enable a large-sized pneumatic system to take the form of a wheel.

The film reflector shown in FIG. 1*a* is designed as to be unfolded under compressed gas pressure created in the pneumatic system by the source of compressed gas (SCG), which is not shown in FIG. 1*a*. The radiation reflector in FIG. 1*a* functions as described in the following section.

Referring to FIGS. 1*a*-1*b*, with FIG. 1*b* being an expanded view of inset B shown in FIG. 1*a*, the external pneumatic chamber and radial supports 2 are formed of a flexible tube 4 with apertures 5 overbuilt with or surrounded by globular pneumatic cells 6 made of an elastic material, for example, rubber. The ring tube and radial tubes are pneumatically connected with each other and communicate with the internal pneumatic chamber 3, which, in turn, is connected to the source of compressed gas (SCG) by a hose.

Globular pneumatic cells 11, which form radial supports 2, pneumatically communicate with the tube 4 of the external pneumatic chamber 1. Tubes 4, 10 have apertures 5, shifted against each other at a distance equal to the diameter of the globular pneumatic cells 6, 11 of the external ring 1 and radial supports 3 respectively. The globular pneumatic cells are overbuilt on or surround hoses 4 and 10 so that the spheres would interact, that is, repel each other while gas feeding.

Under repulsive force of the pneumatic cells, the closed ring hose 4 of the external pneumatic chamber 1 takes the form of a wheel, while the radial supports 12 become straight. Radial tubes 11 of the supports 2 pneumatically communicate with the tube 4 of the external pneumatic chamber 1 and internal pneumatic chamber 3. They make a closed pneumatic system connected by a hose to the source of compressed gas (SCG).

Referring to FIG. 1*c*, when being made, lateral surfaces of the globular pneumatic cells of the external chamber are supplied with the fastening eyelets 7, to which the ends of the taut bands 8, such as fixing threads, are tied. The other equally spaced ends of these taut bands are attached to similar fastening eyelets 7, mounted on the lateral surface of the internal pneumatic chamber 3. The section diameter of the internal chamber 3 is equal to the diameter of the globular cells 6 of the external chamber 1. When feeding compressed gas, the pneumatic cells are filled by it and their interaction make the reflector take the form of a wheel, as shown in FIGS. 1*a*-1*c*.

Fixing threads 8, which connect the eyelets 7 of external and internal pneumatic chambers, are tightened. To unfold the mirror sheet 9, the threads pull it along the whole perimeter in a radial direction. At final tension of the threads, the sheet takes the form of a flat mirror.

To roll up the film reflector, it is necessary to disconnect the source of compressed gas (SCG) from the pneumatic system, to let gas go from the pneumatic system into the environment. By tightening fixing threads 8 and tubes 11 of the radial supports 2, it is possible to roll up the reflector.

As shown in FIGS. 2*a*-2*c* the toroidal pneumatic chambers 13, 17 are used to unfold the designed film radiation reflector. Each of FIGS. 2*a* and 2*c* are partial plan and cross-sectional views of the radiation reflector. Like the prototype, the internal pneumatic chamber has the form of a bicycle inner tube. Flexible tubes 14 of the radial supports 13 are connected with the chamber mechanically and pneumatically at equal angular distances of 90°. The other ends of the radial tubes are also connected at equal distances with the tube that constitutes the concentric pneumatic chamber 17.

In the radiation reflector of the given design, the external concentric pneumatic chamber 17 and radial supports 13 are unfolded with the help of other toroidal pneumatic chambers 17 and 13.

These chambers are overbuilt on or surround the flexible tubes 14. The tubes 14 have apertures arranged at a distance equal to the diameter of the toroidal pneumatic cells 13, 17. The apertures 15, shown in FIG. 2*a*, pneumatically connect the inner cavity of flexible tubes 14 with the inner cavities of all toroidal pneumatic chambers 13, 17 forming the radial supports and the external pneumatic chamber. Once fed with gas, the toroidal chambers take a round form. A part of the tube 14 spanned by the toroidal pneumatic cell become straight. At the interfaces between toroidal pneumatic chambers, interaction, such as repulsion, of pneumatic cells makes the external pneumatic chamber 17 take the form of a circle, while the radial supports 13 become straight.

The whole pneumatic system takes the form of a bicycle wheel.

Toroidal pneumatic chambers, which form the external concentric pneumatic chamber 17, can either be oriented to be perpendicular to the mirror sheet plane, as shown in FIG. 2*b*, or to coincide with the plane of the mirror sheet 19, as shown in FIG. 2*c*.

Attachment of the taut bands or threads 18 to the toroidal pneumatic chambers 17 differs depending on orientation of the latter.

In the first case, the taut bands 18 are attached to the toroidal chambers on both sides. The other ends of the taut bands are attached to the eyelets 7 of the internal pneumatic chamber 3, similar to the embodiment shown in FIGS. 1*a*-1*c*. The taut bands fixed along the perimeter of the mirror sheet pull it to unfold the external pneumatic chamber. If the need arises, the mirror sheet 19 may be stretched on two sides with respect to the radial pneumatic chambers. The need may appear at formation of concave spherical mirror surfaces, as described in the Amirov et al. patent. When planes of toroidal pneumatic chambers 17 coincide in orientation with the plane of the mirror sheet 19, the taut bands 18 are attached to pneumatic chambers 17 in one point 20, as shown in FIG. 2*c*. With this end in view, the toroidal pneumatic chambers 17 can be supplied by eyelets 7 similar to those of the internal chamber 3.

In both cases, once the pneumatic chamber, which consists of the internal and external pneumatic chambers and radial supports, is completely unfolded, the mirror sheet 19, pulled in different directions by the taut bands 18, will take the form of a flat reflector, specula, or mirror.

Toroidal pneumatic chambers also unfold a radiation reflector shown in FIGS. 3a-3b, but here, unlike the embodiment shown in FIGS. 2a-2b, alternate even and odd pneumatic chambers 25, 26 are connected into a chain. FIG. 3b is an expanded view of inset A shown in FIG. 3a.

The internal all-in-one pneumatic chamber 24, like the prototype and the variant shown in FIGS. 2a-2c is of the bicycle inner tube type.

The external pneumatic chamber 22 and the radial supports 23 are of identical design. They consist of flexible tubes 21 forming a closed concentric ring of the external pneumatic chamber 22 and radial supports 23. Radial tubes are joined at equal distances to the concentric tube 21. In our case, the distance equals $2\pi R/4$, where R is the radius of the external pneumatic chambers. The tubes have apertures located in pairs, such as even and odd pairs, at a distance approximately equal to one-third of the toroidal pneumatic chambers diameter. In the tube section, each pair of apertures is shifted through 90° relative to the previous one, so they are in two mutually perpendicular planes of hoses that intersect on axes, such as in planes which intersect on the axes of the hoses.

Toroidal pneumatic chambers or cells are overbuilt on or surround the tubes around the apertures.

The even toroidal chambers 25, overbuilt around the even pairs of apertures, are oriented in a plane perpendicular to the orientation of odd chambers overbuilt around the odd apertures. Thus, the internal cavities of the toroidal chambers 25, 26 through the apertures on the tubes pneumatically communicate with the internal cavities of hoses 21 and the internal chamber 24. In such a way, a single pneumatic system thus is created, which is connected to the source of compressed gas (SCG) by a valve and the hose 30. The SCG is not shown in FIG. 3a.

When feeding gas into the pneumatic system, the toroidal pneumatic chambers 25, 26 are filled with gas and take a round form. At that moment, the part of the tube that passes through diametrically opposite points of the torus, and rigidly connected with it, takes the form of a straight line. So, within the limits of every torus, the tube accepts the piecewise-straight direction. As some part of the hose within the limits of the toroidal chamber diameter, for example, one-third of the hose, on the average, concurrently belongs to both adjacent even pneumatic chambers 25 and odd pneumatic chambers 26, the hose tends to assume the form of a straight line.

All four radial supports 23 will accept the forward direction, while the tube of the external pneumatic chamber 22 assumes the form of the concentric closed ring. It is bound up with the fact that the straightening force created by interaction of toroidal pneumatic chambers 25, 26 is distributed between them in equal parts. By modifying the distance between the centers of the even and odd toroidal pneumatic chambers, gas pressure, cross-section, and material of the tubes and pneumatic chambers, it is possible to control over a wide range the speed of unfolding and the diameter of the film reflector of radiation.

With the reflector completely unfolded, the pneumatic system assumes the form of a bicycle wheel as shown in FIGS. 3a-3b.

For fastening the taut bands 28, the odd toroidal chambers 26 oriented at a right angle to the plane of the mirror sheet 29 are overbuilt with fastening eyelets 27. Similar eyelets are overbuilt on the lateral surface of the internal pneumatic chamber 24. In this case, the section diameter of the internal pneumatic chamber 24 should be equal to the external diameter of the concentric toroidal pneumatic chambers 26.

The taut bands 28 should be elastic and pull the attached mirror sheet 29 along the entire perimeter to the center and outward. The mirror sheet is also made of an elastic material which, when tightened by elastic links or threads, takes the form of a flat mirror.

To suppress rotation of the odd toroidal pneumatic chambers of the concentric hose, fastening eyelets 27 are to be overbuilt on both sides of the chambers. In this case, similar eyelets are also overbuilt on two lateral sides of the internal pneumatic chamber 24. The eyelets on the backsides of the toroidal pneumatic chambers of the external ring are joined to the corresponding eyelets of the internal pneumatic chamber. In that way, radial taut bands form the cavity parallel to the cavity of the mirror sheet. In case of need, two mirror sheets can be stretched at one time.

The rectangular radiation reflector shown in FIG. 4a includes a matrix 32, which consists of pneumatically joined perpendicular flexible tubes. The tubes are made of lightweight elastic material, which can be easily bent and folded. The tubes have apertures 33, equally removed from each other for a distance equivalent to the size of the pneumatic cell 31. The tube has pneumatic cells 31 in the form of a parallelogram or cube around each aperture 33. The pneumatic cells are made of an elastic material, for example, rubber. The pneumatic cells 31 are arranged in such a way that the walls of adjacent cells interact, that is, repel each other. Their mutual pressure results in straightening of the flexible tubes 32. The tubes must not stretch tinder pressure of gas. FIG. 4d shows the pneumatic cells 38 in the form of the spherical cover sector.

When feeding gas into the tubes of the matrix 32, the walls of the pneumatic cells stretch and repel each other. As a result, the tubes stretch, and the matrix of tubes assumes the form of a plane as shown in FIG. 4b. The pneumatic cells located along the perimeter of the rectangular reflector have extension eyelets 35 tailored for fastening the taut bands 36 of the mirror sheet 37.

With the reflector completely unfolded, the mirror sheet will take the form of a flat rectangular mirror as shown in FIG. 4c.

A reflector as shown in FIGS. 4a-4c which consists of four rectangular sectors or sections, as shown in FIG. 10, whose angular positions can be changed independently of each other, allows creation of a solar sail to pilot a space vehicle (SV) without fuel consumption.

To create rectangular reflectors of radiation, as shown in FIGS. 5a-5c, it is possible to use the effect of interaction of the toroidal pneumatic cells joined into a chain, as similarly shown in FIGS. 3a-3c.

First, as shown in FIG. 5a, a matrix is constructed of mutually perpendicular flexible tubes 41 mechanically and pneumatically joined to each other and supplied with periodically repeating apertures 42. The apertures in tubes 41 are arranged in pairs in two perpendicular planes, like in FIGS. 3a-3c, and surrounded by toroidal pneumatic cells such as pneumatic chambers 39, 40. The even pneumatic chambers 39 are oriented in the plane perpendicular to the plane of the drawing, that is, to the mirror sheet. Orientation of the odd pneumatic chambers 40 is perpendicular to orientation of the even chambers, that is, it coincides with the plane of the drawing, as shown in FIG. 5a. FIG. 5b is an expanded view of inset A in FIG. 5a. In that way, a matrix 44 is created, which consists of interlacing chains made by even sets 39 and odd sets 40 of the toroidal pneumatic chambers 44. When feeding gas into the cavity of the flexible tubes of the matrix 41, the toroidal pneumatic cells 39, 40 are filled with gas. Each cell assumes the round form of the torus, while tubes of the matrix 41 assume the piecewise-straight form within the limits of every torus.

Thus the whole of the matrix 44 takes the form of a plane, as shown in FIG. 5c.

Position 43 shows the junction of the flexible tubes of the matrix 41 with the walls of the angled toroidal pneumatic cells.

To fasten the taut bands 46 of the mirror sheet 47, the lateral surfaces of to the even pneumatic cells 39 located at the periphery of the reflector are provided with fastening eyelets 45. The elastic taut bands 46 along the entire perimeter join the mirror sheet having a reflecting metal coat with a quadrangular matrix 44. At complete unfolding of the reflector, the mirror sheet 47 assumes a flat form.

The concave film spherical reflector of radiation shown in FIGS. 6a-6d is designed and released as described in the following section.

Figure 6A:
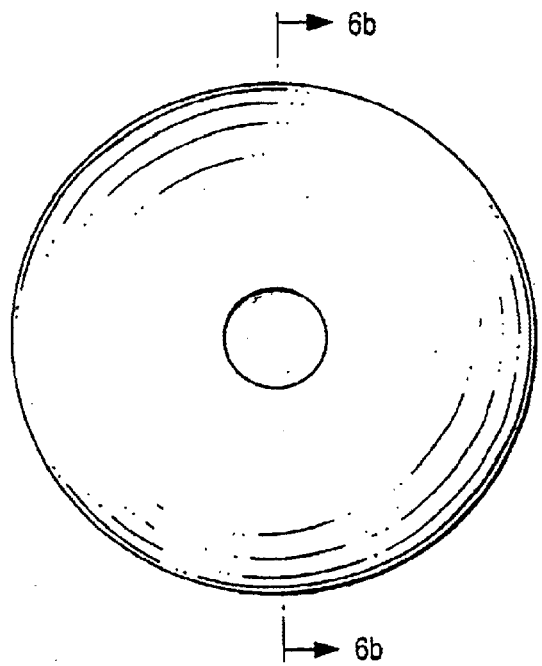
FIGS. 6a-6d show the design of a spherical reflector.
Figure 6B:
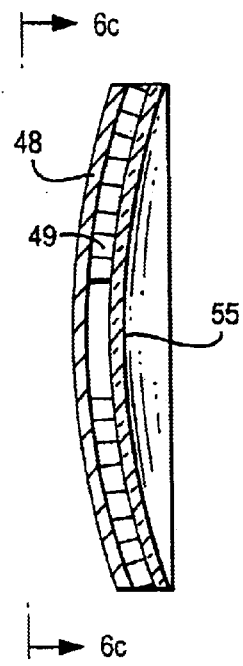
Figure 6C:
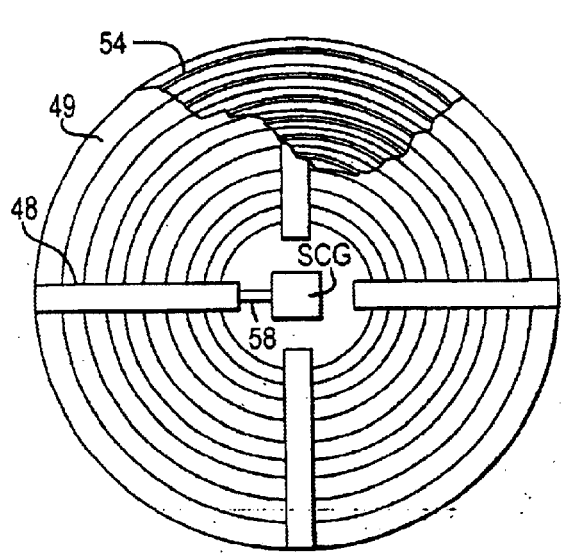

The spherical reflector in FIGS. 6a-6d includes radial sectional pneumatic tubes 48, arranged at regular intervals over the entire surface of the reflector. FIG. 6b is a side view along lines 6b—6b in FIG. 6a, and FIG. 6c is a partial cross-sectional view along lines 6c—6c in FIG. 6b. In addition, the reflector has N interacting concentric sectional pneumatic tubes. These pneumatic tubes interact with radial sectional pneumatic tubes 48 to which they are pneumatically joined. Sectional pneumatic tubes 48, 49 have flexible tubes 50 with apertures 51. These tubes are pneumatically joined to each other and communicate with the source of compressed gas (SCG). The apertures 51 are arranged with equal spacing determined by the size of the cell. Tubes 50 are provided with pneumatic cells 52 repeating the form of a sector of the spherical envelope. The cells 52 are made of an elastic material, for example, of rubber.

The walls of pneumatic cells 52 interact, thus causing an inflexion of tubes 50 and corresponding sectional pneumatic tubes 48, 49. The bending radius is determined by the inclination of lateral sides of the cells 52 belonging to the sectors of the spherical envelope. As the length of the tubes 50 does not depend on the pressure of gas filling them, the diameter of the spherical mirror is constant.

Interaction between the walls of the pneumatic cells 52 in the line of 10 corresponding concentric pneumatic tubes 49 and between the neighboring lines, as well as the interaction with the radial pneumatic tubes 48 joined to them, results in a building up of the basis of the spherical mirror as shown in FIGS. 6a-6d.

In order to press the mirror sheet 55 to the spherical basis of the reflector, as shown in FIGS. 6a-6d, the bases of the pneumatic cells 52, that is, the bases of sectors of the spherical envelope are overcoated with a metal layer 53. The metal coat 53 is applied on concentric sectional pneumatic tubes 49 so that the concentric conducting rings are isolated from each other. For this purpose, the metal coat 53 is applied to place dielectric parts on two sides. On the other two sides, the metal film is sprayed to partially cover the lateral sides of a tetrahedral pyramid. Feeding gas into the pneumatic cells 52 in the unfolded position of the reflector will provide metal coats of neighboring cells inside conducting ring.

Figure 6D:
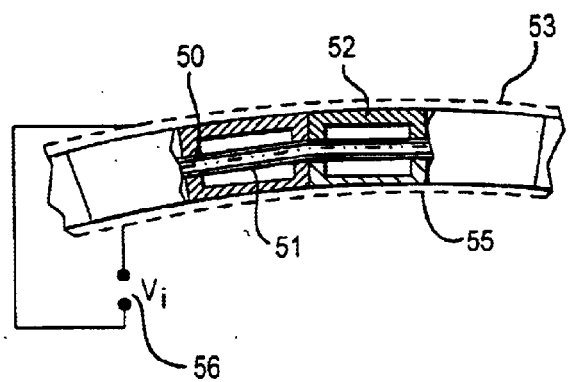

As shown in FIG. 6d, each of the metal rings is connected to a separate source of adjustable voltage 56. Negative terminals of the sources of adjustable voltage $V_i$ are connected in parallel with each other and with the metal reflecting coat of the mirror sheet 55. In the most ordinary case, all sputtered rings 54 can be bridged and connected to the positive terminal of the source of electromotive force (EMF). By varying the EMF values, it is possible to change the radius of curvature and the sag of the spherical mirror.

The elastic mirror sheet assumes the form of a sphere, of which the sag and surface depend on the elasticity of the mirror sheet and the voltage values on the concentric conducting metal stripes 54.

The external ring 57 and the radial supports 58 are assembled from small hollow balls 60 or rings 63 of light material, for example, plastic, to form the reflector of radiation designed as shown in FIGS. 7a-7d. FIG. 7b is an expanded view of inset A in FIG. 7a, and FIG. 7c is a side view along lines 7c—7c in FIG. 7b.

The balls or the rings have two apertures 61 on the diametrically opposite sides, as shown in FIG. 7b. The balls or rings of the external ring 57 are threaded on the cable 62, whose ends are passed through the aperture 69 of the central cell 68, as shown in FIG. 7b, and through apertures in the balls of one of the radial supports 58. The cable 62 of the external ring also has central cells 68 threaded onto it in the interfaces of the radial post 58 with the external ring 57. With the general number of balls of the external ring equal to N, the central cells 68 are placed after every N/M balls, where M is the number of supports.

In FIGS. 7a-7d, the number of supports M is equal to four. The number of balls N should be divisible by M. The ends of cables 62 of the radial supports 58 are fastened to the central cells 68. The cables 62 are wove through apertures of the balls 60 or rings 63 of the radial supports and pass through apertures in the internal ring 59. The internal ring 59 is rigid and has a number of apertures P symmetrically arranged along the perimeter of the ring.

The ends of the cable 62 of the external ring are also wove through apertures 69 of the central cell 68 and through apertures in the balls of one of the radial supports 58. Furthermore, they pass through an aperture of the internal ring 57, as shown in FIG. 7d. With the ends of the cables 62 released, the balls, which constitute the external ring 57 and the radial supports 58, can be easily stowed and packed up. The cable 62 is tightened with the help of a unit 67 designed to tension and restrain cables in the direction to the center of the internal ring, so the balls collect into the form of a bicycle wheel. Balls of the external ring 57 assume the form of a circle, while balls of the radial supports 58 collect along the straight line connecting apertures of the internal ring 59 with the central cells 68 threaded onto the cable of the external ring.

After the reflector assumes the form of a wheel it is necessary to fix the ends of the cable 62 and the position of the reflector. To unfold the external ring 57 of the reflector, the balls 60 pull the taut bands or threads 66 bound to the eyelets 65. The taut bands are arranged like the spokes of a bicycle wheel. The other ends of the fixing threads are rigidly attached to the internal ring 59 at regular intervals. To obtain a flat mirror surface, the distance between apertures in the internal ring 59 must be equal to the diameter of the balls 60 which constitute the external ring 57.

To be used for fastening the links 66, the rings 63 must have apertures 61 drilled in them at the intervals equal to the distance between mounting holes of the internal ring 57.

In this case, when tightened, the fixing threads 66 on two sides of the reflector become parallel to each other. An external edge of the mirror sheet is rigidly fastened to the taut bands or threads 66. When the fixing threads 66 tightened, the mirror sheet takes the form of a plane. In case of need, the mirror sheet 55 can be fastened to fixing threads on two sides. This allows for the creation of two specular planes parallel to each other.

To assemble the reflector it is necessary to release the fixed ends of the cables 62, to take the ends out of the apertures of the internal ring 59, and to fold the reflector by tightening separately the ends of radial cables.

In order to obtain a spherical mirror, light-reflecting cells in the form of the spherical envelope sector can be used, as shown in FIGS. 8a-8b. FIG. 8b is an expanded perspective view of inset A of FIG. 8a. The lateral sides of the cells have apertures drilled in the middle of them. Through these apertures two parallel cables are passed. The concentric rings are joined to each other by radial cables passed through reflecting cells all along the circle. Similarly to the designs shown in FIGS. 7a-7d, the ends of the cables are led out through the apertures of the internal ring and joined to the mechanism for tightening and fixing position of the cables 76.

This mechanism tightens the cables 75 of the concentric rings 71 in a certain sequence from the center to periphery, thus forming concentric reflecting rings. Each neighboring ring has cells 72 that differ in structure. The quantity of cells and their size grow with the increase of the number of rings. The radii of curvature of reflecting surfaces 73 and their size and configuration are calculated and made so that tightening of the cable would make the ring cells 72 assume the form of concentric rings 71, while the reflector itself takes the form of the spherical envelope sector, similar to that shown in FIGS. 8a-8b. For mutual orientation of separate cells, their lateral sides can also be coated with a magnetic film. Force lines of the magnetic field north-to-south (N→S) of the neighboring cells should be oriented at right angles to each other. In this case there is no necessity for two ring cables, since one cable is enough.

The principle of operation of the described construction is described as follows in conjunction with the reflector shown in FIG. 7a-7d.

The reflector of radiation, shown in FIGS. 8a-8b, functions by having the concentric rings 71, which form the spherical surface of the reflector, consist of cells in the form of a sector of the spherical envelope 72. Their upper faces are reflecting surfaces, and so are coated with the reflecting metal layer 73 have a semi-spherical form with the given radius of curvature. All the cells 72 that make an N-cell concentric ring 71 are identical in size and design. As the distance from the center of the reflector increases together with N, the number of cells in the concentric ring 71 rises and the design of the cells also changes. The radii of curvature of the internal and external faces of the cells 72 between the rings and the angles between lateral faces of the cells change as well.

The structure of the cells that form each of the concentric rings 71 should be calculated in advance. When assembled, the N-cell concentric ring of the spherical reflector must form a ring of the spherical envelope cut by cones with solid angles α1 and α2.

Two cables, which pass through the apertures 74 in the center of opposite flat faces, are used to orient the cells 72 relative to each other and to form a closed ring of the spherical surface 71. When tightened, the cables 75 become parallel and press flat faces of the cells 72 against each other. The mechanism 76 for tightening and fixation of cables pulls ends of the cables 75 in a radial direction through special pulleys 78 incorporated into the central cells 77. The ends of the cables 75 are closed on a circle and allowed to pass through the pulleys 78, which rotate around the axes 79.

The pulleys 78 are incorporated into the central cells. After passing through the pulleys, the ends of the cables are passed through the radial apertures 74a in the cells 72. Having run through the apertures in the cell of the central concentric ring, the ends of the cables are joined to the mechanism 76 for tightening and fixation of cables.

This mechanism provides tension to each of the two cables from both sides and fixes their position. This permits the assembling and forming of the spherical mirror from the central ring 71 gradually adding rings from the center to the periphery. In addition, the radial apertures in the cells 74a that admit the ends of the cables tightening different concentric rings are shifted against each other and arranged in regular intervals along the perimeter of the reflector.

As a result, tightening of the cables 75 not only forms concentric spherical rings 71, but joins them to each other as well. This ensures formation of a spherical reflector that has the adjusted cells 72 not only inside every concentric ring but also in the adjacent rings. Accuracy of adjustment is determined by the clearance between the cable and the wall of apertures 74, 74a in a cell. For more exact adjustment of the cells 72 to each other, their adjacent faces may have conical or globular projections and hollows founded in them. Two projections and two corresponding hollows in the adjacent faces of the cells ensure their exact mutual orientation and a spherical surface for high accuracy and quality.

The mechanism of cable tension and fixation 76 draws out, in turn, both ends of (he cables 75, which form concentric rings 71. Extreme tension of both cables makes the concentric ring 71 take the form of a circle. The cables ends are fixed in this position so that the cables remain in tension.

After all the cables have been tightened, the concentric rings 71 form an integral construction with a spherical concave mirror surface. With properly designed reflecting cells 72, it is possible to obtain surfaces which are either flat or forms of a parabolic cylinder.

The given design of the reflector may attain radii of any curvature and various forms of spherical surfaces or parabolic cylinders. Cells that form the reflector might be made of any material such as quartz, glass, plastic, etc, and they might have a reflecting metal coat.

The reflector of radiation shown in FIGS. 9a-9b has only one external pneumatic chamber 80. FIG. 9b is a side cross-sectional view of the reflector shown in FIG. 9a. The chamber consists of flexible tube with the overbuilt even and odd toroidal pneumatic cells 81, 82. They are arranged to form a chain of mutually encircled toroidal pneumatic chambers so that the odd pneumatic chambers 82 are oriented in the plane perpendicular to the plane of the even chambers 81. In addition, one and the same part of the flexible hose equal in size to approximately one-third of the inner diameter of the torus belongs simultaneously to a pair of neighboring pneumatic cells. The hose and pneumatic cells 81, 82 form a closed pneumatic system, which is connected to the source of compressed gas (SCG). During gas feeding, the toroidal pneumatic cells 81, 82 take the form of a bicycle inner tube and pull the flexible hose joined to them in diametrically opposite points.

As a part of the hose, equal in size to approximately one-third of inner diameter of the toroidal pneumatic cell, belongs simultaneously to a pair of neighboring pneumatic cells, the closed external chamber assumes a round form with piecewise-straight areas. This results from the fact that the straighten flexible hose with pneumatic cells, will be evenly applied to all pneumatic cells of the external chamber.

For fastening the taut bands 84, diametrically opposite points of toroidal pneumatic cells oriented perpendicular to the plane of the mirror sheet are provided with fastening eyelets 83.

The taut bands 84 join the first mirror sheet 85 to one side of the external pneumatic chamber 80, and the second mirror sheet 86 to the other side.

The second mirror sheet includes a conducting metal layer evaporated thereon in the form of isolated concentric conducting rings. Terminals of the different sources of adjustable voltage 88 are connected to the conducting rings 87 of the second mirror sheet in relation to the specular reflecting metal layer of the first sheet 85. Under the action of electrostatic forces, the parallel elastic mirror sheets 85, 86 gravitate, and their surfaces take a spherical form. To change configuration of the spherical surface, voltage of different values is fed to the rings 87. By selecting material for mirror sheets 85, 86, changing the width of conducting rings 87, the distance between them, and voltage values on the rings, it is possible to obtain the necessary radius of curvature and the desired form of the spherical surface of the radiation reflector.

For changing orientation, the external pneumatic chamber 80 is rigidly mounted on the device 89 for orientation of the reflector. This device provides rotation of the opened reflector about the axes OX, OY at the angles ±α,±β, respectively. In weightlessness and the vacuum of space, the device for orientation can easily control orientation of a large-sized film reflector.

FIGS. 10a-10d show the design of a rectangular radiation reflector, which is also unfolded with the help of toroidal pneumatic chambers.

Figure 10B:
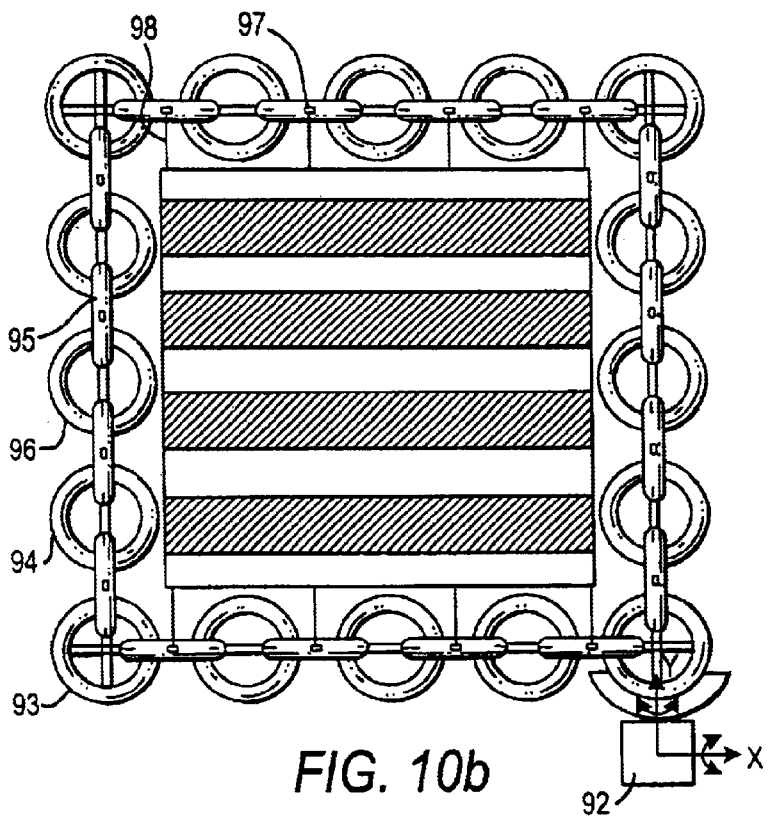
FIGS. 10a-10d show the design of a rectangular flat-surfaced reflector and a reflector in the form of parabolic cylinder.
Figure 10C:
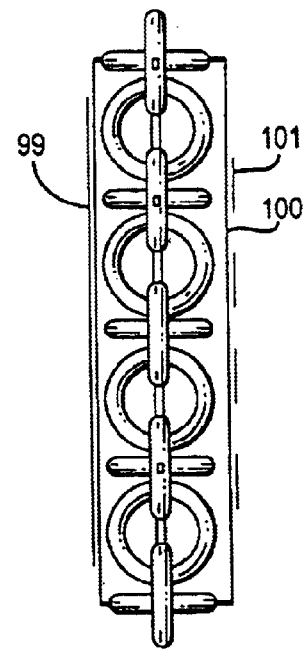
Figure 10D:
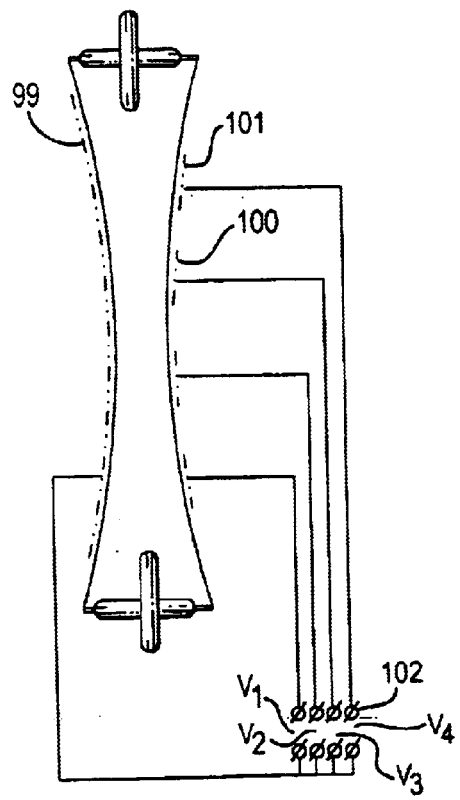
Figure 10A:
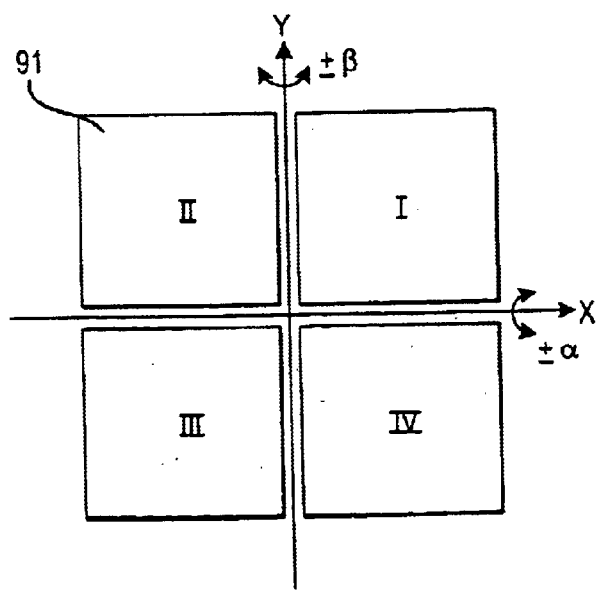

The rectangular flat reflector shown in FIG. 10a consists of four sections 91 labeled I, II, III and IV. As shown in FIG. 10b, each section 91 is oriented independently with the help of the appropriate orientation devices 92. All the sections are of identical design. The outer contour 94 of the section has a rectangular form, and consists of four central cells 93 and straight sides. The central cells and rectilinear sides are made of the even 95 and odd 96 toroidal pneumatic chambers, overbuilt on a flexible tube like a chain, similar to the configuration shown in FIGS. 9a-9b.

Owing to tile design of the central cells 93, pneumatic chambers that make the contour of the rectangular reflector are grouped along four mutually perpendicular sides.

When feeding compressed gas, the contour assumes the rectangular form. Pneumatic cells, oriented perpendicular to the plane of the mirror sheet 99 on each side, have overbuilt eyelets 97. The eyelets are joined to the taut bands 98, which help to establish the first and the second mirror sheets in parallel to each other. FIG. 10c is a side view of the section shown in FIG. 10b, with a conducting metal coat of the second mirror sheet 100 is applied in the form of isolated rectilinear strips 101 parallel to each other, shown in a side view in FIG. 10d.

As shown in FIG. 10d, these strips are connected to various sources of adjustable voltage 102 relative to the metal reflector of a layer of the first mirror sheet 99.

When a voltage is applied to the metal strips 101, elastic mirror sheets 99, 100 are affected by electrostatic forces to assume the form of a parabolic cylinder. By selecting the material from which the mirror sheets are made, the width of strips, their number and arrangement, as well as the voltage values on the strips, it is possible to change the radius of curvature and the form of the parabolic mirror.

FIGS. 11a-11b show the design of a rectangular radiation reflector, which has an elastic cable instead of the external pneumatic chamber, as shown in FIGS. 3a-3b. FIG. 11b is a side view of the reflector shown in FIG. 11a.

The internal pneumatic chamber 103 and the extensible radial supports are established on the toroidal pneumatic cells 104 similar to the constructions shown in FIGS. 3a-3b and 10a-10d.

When feeding compressed gas, the radial supports extend, thus drawing the elastic cable 105 fixed to their external ends.

Fastening eyelets 106 serve for joining the radial supports 104 to the elastic cable 105. The direction in which the radial supports extend is determined by the position or orientation of the first toroidal pneumatic chamber, joined mechanically and pneumatically to the internal pneumatic chamber 103.

The mirror sheet 108 is joined to the elastic cable 105 along the whole perimeter with the help of suspenders 107. Upon complete unfolding of the reflector, the mirror sheet takes the flat form.

The radiation reflector shown in FIG. 12 functions as described in the following section.

The radiation reflector in FIG. 12 differs from the reflector in FIGS. 3a-3b in construction of the radial supports 111 and external pneumatic chamber 110. They have no flexible radial and concentric hoses. The toroidal pneumatic chambers 112 that make radial supports and external pneumatic chamber are mechanically fixed to each other with the help of connecting sleeves 113.

The sleeves 113 may be made of plastic or rubber. If sealed at both ends by heating and mechanical pressure, the sleeves make a reliable mechanical junction between neighboring toroidal pneumatic cells. They have apertures, by which the cells are pneumatically joined to each other and make an integral pneumatic system.

Mechanical conjunction of neighboring toroidal pneumatic chambers can be carried out with the help of glue. For that, before pasting them together, the pneumatic cells should have apertures drilled therein to ensure pneumatic junction between internal cavities of toroidal pneumatic chambers 112.

In comparison with the construction in FIGS. 3a-3b, the given design of the reflector is more practically feasible, scales less and, therefore, is more economical.

When feeding gas into the pneumatic system from the source of compressed gas (SCG), the toroidal pneumatic cells assume the round form of a torus. Interaction between toroidal pneumatic cells 112, which form the radial supporters 111 and the external pneumatic chamber 110, makes the pneumatic system assume the form of a bicycle wheel, as shown in FIG. 12.

Toroidal pneumatic cells 112, which form the external pneumatic chamber 112 and the external perimeter of the internal pneumatic chamber 109 are provided with the overbuilt fastening eyelets 115. The mirror sheet 114 is fastened to these eyelets with the help of thin elastic taut bands 116.

The cross-section of the internal pneumatic chamber 110 should be equal to the external diameter of the torus 112. In this case, the stretched mirror sheet 114 becomes parallel to the plane in which the centers of the toroidal pneumatic chambers that make the radial supporters 111 and the external pneumatic chamber 110 of the reflector are oriented.

If it is necessary to form spherical film-type specular surfaces, fastening eyelets 115 are overbuilt on toroidal pneumatic chambers 110 which make the external pneumatic chamber 110, as well as on the either side of the internal pneumatic chamber 109 similarly to the construction shown in FIGS. 9a-9b.

To limit the diameter of the reflector assembled of globular pneumatic cells, it is possible to pass a strong thin thread, for example, kapron, through the apertures in the pneumatic cells along the perimeter and radial supports. This will make the toroidal pneumatic chambers assume the form of an ellipse, and globular cells take the form of an oblate spheroid.

The rectangular reflector of radiation in FIGS. 13a-13f functions as follows. This reflector differs from the one shown in FIGS. 10a-10d for it is unfolded with the use of direct interaction between toroidal pneumatic chambers 116 or between globular pneumatic cells shown in FIG. 12. FIG. 13b is a side view of the reflector of FIG. 13a.

Unlike the constructions in FIGS. 1a-1c and FIGS. 2a-2c the reflector shown in FIGS. 13a-13f has no flexible hose.

The toroidal pneumatic chambers 116 or globular pneumatic cells 122 are joined to each other with the help of sleeves 118 shown in FIG. 13b. Apertures in the sleeves provide pneumatic juncture between the cells.

The central cells 117 provide juncture of two adjacent sides of the rectangular reflector at right angles.

When feeding gas into the pneumatic system, the interaction between toroidal pneumatic chambers 116 or globular pneumatic cells 122, as shown in FIG. 13c with connector 123 joining adjacent cells 122, will make the pneumatic system assume the rectangular form shown in FIG. 13a. The diametrically opposite sides of toroidal pneumatic chambers and globular pneumatic cells are provided with overbuilt, surrounding, or pasted on fixing eyelets 119.

As shown in FIG. 13a, a mirror sheet 121 is fastened to these eyelets with the help of the taut bands 120. The mirror sheet 121 can be fixed on one side, as shown in FIG. 13b, or on two sides as shown in FIG. 10c. With the reflector completely unfolded, the specular sheet 121 takes the form of a flat mirror.

To get parabolic specular surfaces similar to those in FIG. 10d, the mirror sheets are fastened to the rectangular contour only on two sides. Owing to electrostatic force generated by applying voltage to the mirror sheets, it is possible to have parabolic specular surfaces as shown in FIG. 10d.

The surface area of the sphere with the R radius is equal to $S_{sp}=4\pi R^2$, while the surface of the torus of the same outer radius R is equal to $S_t=4\pi^2 r(R-r)$, where r is the radius of the torus section. So, the ratio is as follows:

$$\frac{S_{sp}}{S_t} = \frac{4\pi R^2}{4\pi^2 r(R-r)} = \frac{R^2}{\pi r(R-r)}.$$

For example, at R=5 cm., r=0.5 cm., $$\frac{S_{sp}}{S_t} = \frac{25}{6.75} = 3.7.$$

Therefore, the surface area of the torus with the same overall dimensions is reduced by a factor of 3.7, with the following reduction in the amount of material used and the weight of the reflector.

Accordingly, this implicates reduction in the volume of compressed gas necessary for unfolding the reflector. With the above-stated notations and dimensions of the torus and globular pneumatic cell the ratio of the volumes can be defined as follows:

$$V_{sp} = \frac{3}{4}\pi R^3 = \frac{3}{4} \cdot 3.14 \cdot 5^3 = 500_{CM^3}$$

$$V_t = 2\pi^2 r^2 (R-r) = 20.25_{CM^3}$$

$$\frac{V_{sp}}{V_t} = \frac{500}{20.25} \approx 25$$

As evident from the above ratios, a reflector assembled of pneumatic cells in the form of toroidal pneumatic chambers, as shown in FIGS. 12-13f, is economically much more feasible.

The design of toroidal pneumatic cells must be practically feasible and technologically well thought-out. There should be provided an extension of the external ring and radial supports with the help of separate cells, as shown in FIG. 13d, and their joining.

The central cells shown in FIG. 13e allow joining of toroidal pneumatic chambers at right angles. The cells, in which the radial supports are joined with the concentric external chamber, have three apertures as shown in FIG. 13f, to provide pneumatic connection of the radial supports with the external chamber.

The joining of toroidal pneumatic cells with each other is performed with the help of glue. The glue provides necessary mechanical durability of the interface attachment and its impermeability. As shown in FIGS. 13d-13f, three versions of pneumatic cells provide all necessary junctures between them upon formation of round and rectangular radiation reflectors as shown in FIGS. 12-13f.

A master arm of a space manipulator or robot can be created on the same principle as was worked out for creation of radial supports.

Radiation reflectors, which are unfolded in the above ways, can be used as solar sails of space vehicles, as passive reflectors in space radio-telephone and television communication, and for concentration of solar beams for pointing them at ground and air objects of an enemy with the purpose of their destruction.

Similar to the prototype, the suggested controllable radiation reflector can be used in systems for city illumination at night, as well as for creation of large solar sails. By using the sail orientation, it is possible to put a space vehicle (SV) into a higher orbit. First, the SV is put in the lowest orbit, and then with the help of the controlled solar sail, the SV is put in a geostationary orbit. The solar sail may be used for launching interplanetary vehicles or for sending SVs to other galaxies.

On the ground, such reflectors can be used for increasing the efficiency of solar batteries, for heating water, etc.

Sources of information used in drawing up the present application include: Project "Znamya", Rocket Space Complex "Energia"; and S. D. Amirov and A. S. Aliev, "System for Illuminating an Object" described in an issued Russian patent having application number RU 19990111294, now Russian Patent Number RU2,163,353 C1.

What is claimed is:

1. A radiation reflector comprising:
    a plurality of flexible perforated tubes, each flexible perforated tube having an aperture, with the plurality of flexible perforated tubes arranged to form:
        a plurality of pneumatically connected internal and external pneumatic chambers; and
        a plurality of radial supports connected to the plurality of pneumatically connected internal and external pneumatic chambers;
    a source of compressed gas connected to one of the plurality of flexible perforated tubes;
    a first mirror sheet formed of an elastic dielectric film and coated with a radiation reflecting metal layer, with the first mirror sheet connected to a set of the plurality of flexible perforated tubes; and
    a plurality of interacting globular pneumatic cells, with each of the globular pneumatic cells including:
        an elastic material which surrounds a respective aperture of a respective perforated tube.

2. The radiation reflector of claim 1, wherein each of the apertures is connected to a respective one of a plurality of toroidal pneumatic chambers arranged with an internal cavity which communicates with an internal cavity of a respective perforated tube, pneumatically joined to a respective internal pneumatic chamber, and pneumatically joined to the source of compressed gas; and wherein each of the toroidal pneumatic chambers, with the aid of a respective taut band, interacts with the first mirror sheet.

3. The radiation reflector of claim 2, wherein the toroidal pneumatic chambers are arranged to form a chain; and wherein alternate even and odd toroidal pneumatic chambers are oriented in perpendicular planes and interact among themselves using the taut bands associated with the first mirror sheet.

4. The radiation reflector of claim 2, further comprising:

an elastic cable which interacts with the taut bands to bind a plurality of ends of the radial supports.

5. The radiation reflector of claim 1, wherein the pneumatic chambers form a matrix of mechanically joined and pneumatically communicating flexible tubes; and wherein the globular pneumatic cells interact among themselves and with the first mirror sheet.

6. The radiation reflector of claim 2, wherein the pneumatic chambers form a matrix of mechanically joined intertwined chains of toroidal pneumatic chambers, with the toroidal pneumatic chambers being oriented at right angles and interacting among themselves and with the first mirror sheet.

7. The radiation reflector of claim 1, further comprising:

a hemispherical basis formed by radial and concentric sectional pneumatic flexible tubes connected mechanically and pneumatically and interacting between themselves;

wherein the tubes have the respective apertures surrounded by an interacting pneumatic cell composed of an elastic material in the form of the spherical envelope; and wherein each upper face of a respective pneumatic cell has a conducting metal coating applied in the form of concentric rings connected to the terminals of an adjustable voltage sources relative to the reflecting metal covering of the first mirror sheet.

8. The radiation reflector of claim 1, wherein the first mirror sheet, a ring of the external pneumatic chambers, and the radial supports form a ring of small hollow balls or rings threaded onto the cables, the ends of which are passed through the apertures of a plurality of internal pneumatic chambers forming a rigid internal ring and joined by a cable providing tension and fixation.

9. The radiation reflector of claim 1, further comprising:

a hemispherical basis having a plurality of concentric rings, with each concentric ring including a ring of radiation-reflecting cells in the form of a spherical envelope sector;

wherein each of the radiation-reflecting cells have a metal coating and are threaded onto a pair of concentric cables passed through the middles of the opposite faces of the radiation-reflecting cells; and wherein the concentric rings are joined to each other by radial cables, passed through the radiation-reflecting cells, with the ends of the concentric and radial cables joined to cable tension and fixation means.

10. The radiation detector of claim 1, further comprising:

a second mirror sheet established in parallel to the first mirror sheet and connected to one of the external pneumatic chambers, with the second mirror sheet including:

a metal coating having a plurality of concentric conducting rings connected to a source of adjustable voltage providing a voltage relative to the metal coating of the first mirror sheet; and an orientation device connected with external pneumatic chamber for orienting a portion of the radiation reflector.

11. The radiation reflector of claim 10, further comprising:

a section composed of pneumatic chambers and having a rectangular outer contour joined to the orientation device and to the second mirror sheet;

wherein the second mirror sheet is oriented to be parallel to the first mirror sheet; and wherein the second mirror sheet includes a plurality of metal conducting strips connected to the source of adjustable voltage providing a voltage relative to the metal coating of the first mirror sheet.

12. The radiation reflector of claim 11, wherein the section is formed from a chain of mechanically and pneumatically joined toroidal pneumatic chambers or globular pneumatic cells, which interact among themselves and with one of the first mirror sheet and the second mirror sheet.

13. The radiation reflector of claim 1, wherein the plurality of external pneumatic chambers and the plurality of radial supports are formed from a ring of mechanically and pneumatically connected toroidal pneumatic chambers and globular pneumatic cells;

wherein the toroidal pneumatic chambers forming one of the plurality of radial supports is oriented in a plane parallel to the first mirror sheet; and wherein one of the plurality of external pneumatic chambers is oriented in a plane perpendicular to the first mirror sheet, which interacts with the pneumatic chambers by taut bands.

14. The radiation reflector of claim 11, wherein the rectangular external contour is formed from chains of the mechanically and pneumatically connected toroidal pneumatic chambers or globular pneumatic cells, which interact among themselves and with the first mirror sheet.

* * * * *

UNITED STATES PATENT AND TRADEMARK OFFICE
CERTIFICATE OF CORRECTION

PATENT NO.    : 6,848,796 B2
DATED         : February 1, 2005
INVENTOR(S)   : Tagirov et al.

It is certified that error appears in the above-identified patent and that said Letters Patent is hereby corrected as shown below:

<u>Title page,</u>
Item [75], Inventors, please add -- Abdulla Sirajutdinovitch Aliev, RU, 367020, Makhachkala, ul. 1 Sadovyi, Pereulok, d. 8-b (RU) --.

Signed and Sealed this

Tenth Day of January, 2006

JON W. DUDAS
*Director of the United States Patent and Trademark Office*